United States Patent
Danilov et al.

(10) Patent No.: US 11,513,714 B2
(45) Date of Patent: Nov. 29, 2022

(54) MIGRATION OF LEGACY DATA INTO AN ORDERED EVENT STREAM

(71) Applicant: EMC IP Holding Company LLC, Hopkinton, MA (US)

(72) Inventors: Mikhail Danilov, Saint Petersburg (RU); Andrei Paduroiu, Bellevue, WA (US); Maksim Vazhenin, Saint Petersburg (RU)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/237,535

(22) Filed: Apr. 22, 2021

(65) Prior Publication Data

US 2022/0342580 A1 Oct. 27, 2022

(51) Int. Cl.
*G06F 3/06* (2006.01)

(52) U.S. Cl.
CPC .......... *G06F 3/0647* (2013.01); *G06F 3/0611* (2013.01); *G06F 3/0683* (2013.01)

(58) Field of Classification Search
CPC ..... G06F 3/0647; G06F 3/0611; G06F 3/0683
See application file for complete search history.

(56) References Cited

U.S. PATENT DOCUMENTS

| | | |
|---|---|---|
| 3,617,587 A | 11/1971 | Nayar et al. |
| 5,826,977 A | 10/1998 | Fowler et al. |
| 7,430,570 B1 | 9/2008 | Srinivasan et al. |
| 8,572,091 B1 | 10/2013 | Sivasubramanian et al. |
| 8,655,825 B2 | 2/2014 | Roesch et al. |
| 8,825,848 B1 | 9/2014 | Dotan et al. |

(Continued)

FOREIGN PATENT DOCUMENTS

| | | |
|---|---|---|
| CA | 2672879 | 4/2008 |
| CN | 1708029 | 12/2005 |

(Continued)

OTHER PUBLICATIONS

Akidau et al., "MillWheel: Fault-Tolerant Stream Processing at Internet Scale" Proceedings of the VLDB Endowment, vol. 6, No. 11, 2013, 12 pages.

(Continued)

*Primary Examiner* — Chie Yew
(74) *Attorney, Agent, or Firm* — Amin, Turocy & Watson, LLP

(57) ABSTRACT

Data migration from a legacy data storage system into an ordered event stream (OES) data storage system is disclosed. In contrast to conventional techniques, the disclosed subject matter can provide for migrating legacy data into a first portion of a vintage OES (VOES) and new data, intended for the legacy data storage system during the migration process, into a second portion of the VOES. The first and second portions of the VOES can then be linked at completion of the migration process. Avoiding writing new data to the legacy data storage system prior to migration enables a corresponding reduction in data access disruption. Moreover, event sequencing by separating migrated legacy events from new events can preserving event order. Scaling of vintage streams can be supported. Vintage streams can support function calls to a single VOES in contrast to the more conventional use of multiple streams.

20 Claims, 10 Drawing Sheets

(56) References Cited

U.S. PATENT DOCUMENTS

| | | | |
|---|---|---|---|
| 8,984,248 B2* | 3/2015 | Morishita | G06F 3/0665 |
| | | | 711/170 |
| 9,407,521 B1 | 8/2016 | Kulkarni | |
| 9,514,018 B2 | 12/2016 | Sikri | |
| 9,639,589 B1 | 5/2017 | Theimer | |
| 9,753,932 B1 | 9/2017 | Brow et al. | |
| 9,898,482 B1 | 2/2018 | Bono | |
| 9,965,215 B1 | 5/2018 | Vazhenin et al. | |
| 10,338,834 B1 | 7/2019 | Dighe et al. | |
| 10,565,208 B2 | 2/2020 | Triou, Jr. et al. | |
| 10,860,457 B1 | 12/2020 | Evenson | |
| 10,867,033 B2 | 12/2020 | Keren et al. | |
| 11,016,826 B2 | 5/2021 | Lehmann | |
| 11,194,638 B1 | 12/2021 | Danilov et al. | |
| 11,314,779 B1 | 4/2022 | Jain | |
| 2004/0199524 A1 | 10/2004 | Rys et al. | |
| 2005/0025152 A1* | 2/2005 | Georgiou | H04L 47/34 |
| | | | 370/394 |
| 2005/0055519 A1 | 3/2005 | Stuart et al. | |
| 2007/0047635 A1 | 3/2007 | Stojanovic et al. | |
| 2007/0220518 A1 | 9/2007 | Verbowski et al. | |
| 2008/0059724 A1 | 3/2008 | Stifter, Jr. | |
| 2008/0184262 A1 | 7/2008 | Ginis et al. | |
| 2008/0288713 A1 | 11/2008 | Lee et al. | |
| 2008/0301135 A1 | 12/2008 | Alves et al. | |
| 2009/0182784 A1 | 7/2009 | Rohit et al. | |
| 2010/0083098 A1 | 4/2010 | Leme et al. | |
| 2010/0125794 A1 | 5/2010 | Hampton et al. | |
| 2010/0205163 A1 | 8/2010 | Eshghi et al. | |
| 2011/0126099 A1 | 5/2011 | Anderson et al. | |
| 2011/0131588 A1 | 6/2011 | Allam et al. | |
| 2011/0249147 A1 | 10/2011 | Ishii | |
| 2012/0102503 A1 | 4/2012 | Meijer et al. | |
| 2012/0109985 A1 | 5/2012 | Chandrasekaran | |
| 2012/0198027 A1* | 8/2012 | Hetzler | G06F 3/0647 |
| | | | 709/219 |
| 2013/0226931 A1 | 8/2013 | Hazel et al. | |
| 2013/0275808 A1 | 10/2013 | McNeeney et al. | |
| 2014/0006465 A1* | 1/2014 | Davis | G06F 16/1752 |
| | | | 707/827 |
| 2014/0089264 A1 | 3/2014 | Talagala et al. | |
| 2014/0223115 A1 | 8/2014 | Dinkjian et al. | |
| 2015/0169449 A1 | 6/2015 | Barrell et al. | |
| 2015/0172120 A1 | 6/2015 | Dwarampudi et al. | |
| 2015/0341212 A1 | 11/2015 | Hsiao et al. | |
| 2015/0355862 A1* | 12/2015 | Hayes | G06F 3/0689 |
| | | | 711/114 |
| 2015/0363245 A1 | 12/2015 | Mutschler | |
| 2016/0042008 A1 | 2/2016 | Tripathy et al. | |
| 2016/0063080 A1 | 3/2016 | Nano et al. | |
| 2016/0210061 A1 | 7/2016 | Soncodi et al. | |
| 2016/0321287 A1 | 11/2016 | Luthra et al. | |
| 2016/0337435 A1 | 11/2016 | Nigam et al. | |
| 2016/0357476 A1 | 12/2016 | Chen et al. | |
| 2017/0075832 A1 | 3/2017 | Bhimani et al. | |
| 2017/0075947 A1 | 3/2017 | Kurilov et al. | |
| 2017/0177249 A1 | 6/2017 | Kurilov et al. | |
| 2017/0177263 A1 | 6/2017 | Das et al. | |
| 2017/0212891 A1 | 7/2017 | Pundir et al. | |
| 2017/0213127 A1 | 7/2017 | Duncan | |
| 2017/0255392 A1 | 9/2017 | Nakashima | |
| 2018/0101842 A1 | 4/2018 | Ventura et al. | |
| 2018/0121307 A1 | 5/2018 | Braun et al. | |
| 2018/0146018 A1 | 5/2018 | Chang et al. | |
| 2018/0176244 A1 | 6/2018 | Gervais et al. | |
| 2018/0184138 A1 | 6/2018 | Shaw et al. | |
| 2018/0329644 A1 | 11/2018 | Das et al. | |
| 2018/0332325 A1 | 11/2018 | Kaitchuck | |
| 2018/0332365 A1 | 11/2018 | Kaitchuck et al. | |
| 2018/0332366 A1 | 11/2018 | Paduroiu | |
| 2018/0332367 A1 | 11/2018 | Kaitchuck et al. | |
| 2018/0336256 A1 | 11/2018 | Li et al. | |
| 2018/0345140 A1 | 12/2018 | Posin | |
| 2019/0004863 A1 | 1/2019 | Mainali et al. | |
| 2019/0026301 A1 | 1/2019 | Wang et al. | |
| 2019/0057138 A1 | 2/2019 | Knowles et al. | |
| 2019/0129806 A1 | 5/2019 | Hsu et al. | |
| 2019/0138494 A1 | 5/2019 | Inoue | |
| 2019/0197173 A1 | 6/2019 | Tahara et al. | |
| 2019/0278849 A1 | 9/2019 | Chandramouli et al. | |
| 2019/0340180 A1 | 11/2019 | Bareness et al. | |
| 2019/0349422 A1 | 11/2019 | Dhruvakumar et al. | |
| 2020/0034468 A1 | 1/2020 | Lei et al. | |
| 2020/0174695 A1 | 6/2020 | Bazarsky et al. | |
| 2020/0250172 A1 | 8/2020 | Busjaeger et al. | |
| 2020/0320005 A1 | 10/2020 | Shulman et al. | |
| 2020/0344299 A1 | 10/2020 | Sohail et al. | |
| 2020/0394196 A1 | 12/2020 | Shivanna et al. | |
| 2020/0404011 A1 | 12/2020 | Gervais et al. | |
| 2021/0110328 A1 | 4/2021 | Hsiao et al. | |
| 2021/0124746 A1 | 4/2021 | Klaedtke | |
| 2021/0157520 A1 | 5/2021 | Bavishi et al. | |
| 2021/0256029 A1 | 8/2021 | Danilov et al. | |
| 2021/0342296 A1 | 11/2021 | Danilov et al. | |
| 2021/0342354 A1 | 11/2021 | Danilov et al. | |
| 2021/0365211 A1 | 11/2021 | Danilov et al. | |
| 2022/0035533 A1 | 2/2022 | Danilov et al. | |
| 2022/0182724 A1 | 6/2022 | Gupta et al. | |

FOREIGN PATENT DOCUMENTS

| | | |
|---|---|---|
| CN | 104901958 | 9/2015 |
| CN | 105591926 | 5/2016 |
| GB | 2377038 | 12/2002 |
| WO | 2002101585 | 12/2002 |
| WO | 2009014993 | 1/2009 |
| WO | 2015191120 | 12/2015 |
| WO | 2018148149 | 8/2018 |

OTHER PUBLICATIONS

Akidau et al., "The Dataflow Model: a Practical Approach to Balancing Correctness, Latency, and Cost in Massive-Scale, Unbounded, Out-of-Order Data Processing" Proceedings of the VLDB Endowment, vol. 8, No. 12, 2015, 12 pages.

"Execution Model" [https://beam.apache.org/documentation/runtime/model/]. The Apache Software Foundation. Retrieved Aug. 26, 2020, 5 pages.

"Apache Beam Programming Guide" [https://beam.apache.org/documentation/programming-guide/]. The Apache Software Foundation. Retrieved Aug. 26, 2020, 69 pages.

"What is Apache Flink?—Applications" [https//flink apache.org/flink-applications.html#building-blocks-for-streaming-applications]. The Apache Software Foundation. Copyright 2014-2019, retrieved Aug. 26, 2020, 7 pages.

"What is Apache Flink?—Architecture" [https://flink.apache.org/flink-architecture.html]. The Apache Software Foundation. Copyright 2014-2019, retrieved Aug. 26, 2020, 3 pages.

"Stateful Function—Event-driven Application on Apache Flink" [https://flink.apache.org/stateful-functions.html] The Apache Software Foundation. Copyright 2014-2019, retrieved Aug. 26, 2020, 8 pages.

"What is Apache Flink?—Operations" [https://flink.apache.org/flink-operations.html] The Apache Software Foundation. Copyright 2014-2019, retrieved Aug. 26, 2020, 3 pages.

"Use Cases" [https://flink.apache.org/usecases.html]. The Apache Software Foundation. Copyright 2014-2019, retrieved Aug. 26, 2020, 5 pages.

"Introduction" [http://kafka.apache.org/intro]. The Apache Software Foundation. Copyright 2017, retrieved Aug. 26, 2020, 6 pages.

"Apache Kafka Quickstart" [http://kafka.apache.org/quickstart]. The Apache Software Foundation. Copyright 2017, retrieved Aug. 26, 2020, 6 pages.

"Use Cases" [http://kafka.apache.org/uses]. The Apache Software Foundation. Retrieved Aug. 26, 2020, 3 pages.

"Architecture Overview" [pulsar.apache.org/docs/en/concepts-architecture-overview/]. The Apache Software Foundation. Copyright 2020, retrieved Aug. 26, 2020, 11 pages.

(56) References Cited

OTHER PUBLICATIONS

"Messaging" [pulsar.apache.org/docs/en/concepts-messaging/]. The Apache Software Foundation. Copyright 2020, retrieved Aug. 26, 2020, 32 pages.
"Pulsar Overview" [pulsar.apache.org/docs/en/concepts-overview/]. The Apache Software Foundation. Copyright 2020, retrieved Aug. 26, 2020, 2 pages.
Office Action dated Jan. 29, 2021 for U.S. Appl. No. 16/256,083, 42 pages.
Notice of Allowance dated Jun. 28, 2021 for U.S. Appl. No. 16/884,647, 39 pages.
Office Action dated Jun. 29, 2021 for U.S. Appl. No. 16/881,556, 24 pages.
Notice of Allowance dated Aug. 4, 2021 for U.S. Appl. No. 17/200,652, 51 pages.
Office Action dated Oct. 1, 2021 for U.S. Appl. No. 16/915,762, 57 pages.
Notice of Allowance dated Dec. 15, 2021 for U.S. Appl. No. 17/064,747, 54 pages.
Office Action dated Nov. 10, 2021 for U.S. Appl. No. 16/944,089, 75 pages.
Kleppmann, Martin. "Making Sense of Stream Processing—The Philosophy Behind Apache Kafka and Scalable Stream Data Platforms"; Mar. 4, 2016; retrieved from [https://hashingit.com/elements/research-resources/2016-03-04-making-sense-of-stream-processing.pdf] on Nov. 5, 2021, (Year: 2016), 183 pages.
Notice of Allowance dated Feb. 4, 2022 for U.S. Appl. No. 16/915,762, 57 pages.
Office Action dated Oct. 1, 2021 for U.S. Appl. No. 17/127,724, 41 pages.
Office Action dated Jan. 21, 2022 for U.S. Appl. No. 16/864,892, 26 pages.
Notice of Allowance dated Feb. 24, 2022 for U.S. Appl. No. 17/038,079, 55pgs.
Azhar et al., ""Efficient selection of access control systems through multi criteria analytical hierarchy process"", IEEE, doi: 10.1109/ICET.2012.6375419, 2012, pp. 1-8. (Year: 2012).
Rox et al., ""Construction and Deconstruction of Hierarchical Event Streams with Multiple Hierarchical Layers"", IEEE, doi: 10.1109/ECRTS.2008.13, 2008, pp. 201-210. (Year: 2008).
Notice of Allowance dated Feb. 18, 2022 for U.S. Appl. No. 17/083,145, 70pgs.
Office Action dated Mar. 21, 2022 for U.S. Appl. No. 16/864,905, 125 pgs.
Muskardin et al., "Implementation of Hashing Algorithms in Stream Mining", International Conference on Smart Systems and Technologies (SST), Oct. 2018, pp. 233-238.
Notice of Allowance dated Apr. 11, 2022 for U.S. Appl. No. 16/944,089, 87 pages.
J. C. Lee, J. Vance and R. Lysecky, "Hardware-Based Event Stream Ordering for System-Level Observation Framework," in IEEE Embedded Systems Letters, vol. 6, No. 4, pp. 81-84, Dec. 2014, doi: 10.1109/LES.2014.2359154. (Year: 2014).
T. Onishi, J. Michaelis and Y. Kanemasa, "Recovery-Conscious Adaptive Watermark Generation for Time-Order Event Stream Processing," 2020 IEEE/ACM Fifth International Conference on Internet-of-Things Design and Implementation (IoTDI), 2020, pp. 66-78, doi: 10.1109/IoTDI49375.2020.00014. (Year: 2020).
Aloysius K. Mok, Honguk Woo and Chan-Gun Lee, "Probabilistic Timing Join over Uncertain Event Streams," 12th IEEE International Conference on Embedded and Real-Time Computing Systems and Applications (RTCSA'06), 2006, pp. 17-26, doi: 10.1109/RTCSA.2006.52. (Year: 2006).
M. Liu, M. Li, D. Golovnya, E. A. Rundensteiner and K. Claypool, "Sequence Pattern Query Processing over Out-of-Order Event Streams," 2009 IEEE 25th International Conference on Data Engineering, 2009, pp. 784-795, doi: 10.1109/ICDE.2009.95. (Year: 2009).
Office Action dated Apr. 20, 2022 for U.S. Appl. No. 16/944,094, 48 pages.
Office Action dated Apr. 12, 2022 for U.S. Appl. No. 17/038,102, 48 pages.
Notice of Allowance dated Apr. 27, 2022 for U.S. Appl. No. 17/127,724, 19 pages.
Office Action dated Jul. 8, 2022 for U.S. Appl. No. 16/864,892, 33 pages.
Office Action dated Jul. 15, 2022 for U.S. Appl. No. 16/864,905, 77 pages.
Office Action dated Sep. 1, 2022 for U.S. Appl. No. 16/944,094, 25 pages.
Office Action dated Jul. 21, 2022 for U.S. Appl. No. 17/070,029, 68 pages.
Notice of Allowance dated Aug. 24, 2022 for U.S. Appl. No. 17/152,544, 55 pages.
Office Action dated Sep. 15, 2022 for U.S. Appl. No. 17/383,425, 61 pages.
Phaujdar, "Understanding Event Streams—A Comprehensive Guide 101_Learn Hevo" [https://hevodata.com/learn/understanding-event-streams/] (Feb. 17, 2021) (Year: 2021).
Dhanushka, "Understanding Kafka Topic Partitions" [https://medium.com/event-driven-utopia/understanding-kafka-topic-partitions-ae40f80552e8] —(Mar. 28, 2021) (Year: 2021).
Splunk, "Comparing Pulsar and Kafka" [https://www.splunk.com/en_us/blog/it/comparing-pulsar-and-kafka-how-a-segment-based-architecture-delivers-better-performance-scalability-and-resilience.html] —(Dec. 5, 2017) (Year: 2017).
Office Action dated Sep. 30, 2022 for U.S. Appl. No. 17/408,344, 66 pages.
Office Action dated Oct. 27, 2022 for U.S. Appl. No. 17/063,906, 59 pages.

* cited by examiner

MIGRATION OF LEGACY DATA INTO AN ORDERED EVENT STREAM

BACKGROUND

Data storage via an ordered event stream data storage system can provide numerous benefits. As such, migrating data from legacy data storage systems can be undertaken. This can result in generating ordered event stream events that can be stored via an ordered event stream of an ordered event stream data storage system.

DETAILED DESCRIPTION

Figure 1:
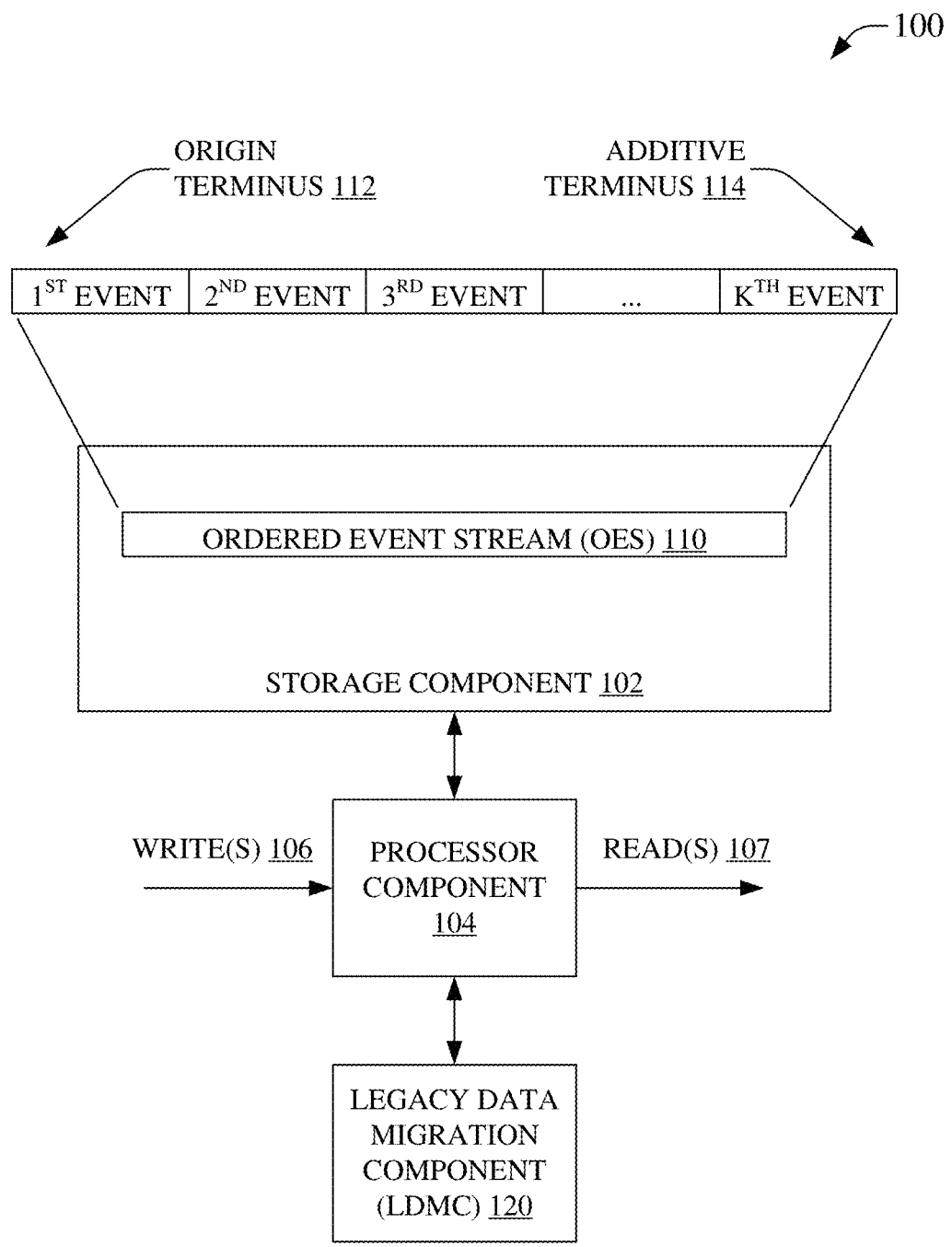
FIG. 1 is an illustration of an example embodiment that can facilitate migrating legacy data into an ordered event stream (OES).

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

The disclosed subject matter relates to data storage via a stream data storage system and, more particularly, to migrating legacy data into an ordered event stream. Conventional legacy data migration techniques can typically be highly disruptive to data access. As an example, data can continue to be written into a legacy system while the migration from the legacy system can be in progress. This can result in extending the migration time. Moreover, where data ordering is important, e.g., the legacy data is being migrated to an ordered event stream data storage solution, ordered access can be disrupted during the migration to avoid possible disordering of data and, where the migration time can be extended due to still writing new events to the legacy system during the data migration, the disruption to ordered access can correspondingly be similarly extended. Techniques for less disruptive migration from a legacy system to an ordered event storage system can be desirable in view of the shortcomings of conventional techniques As is noted hereinabove, conventional legacy data migration techniques can disrupt access to stored legacy data. Where the migration can result in legacy data being stored via a stream of ordered events, e.g., via an ordered event stream (OES) data storage system, the migration of the legacy data can be disrupted during much, if not all, of a conventional migration process to avoid possible disordering of data. Where the migration time can be extended due to shortcomings of conventional techniques, e.g., continuing to write new events into the legacy system even while the data migration is in progress, the disruption to ordered access can also be extended and be that much more disruptive to data access. As such, new techniques for less disruptive migration from a legacy system to an ordered event storage system can be highly desirable.

Generally, an ordered event stream (OES) can be a durable, elastic, append-only, and potentially unbounded, sequence of events. An event can be added to a head of a stream of events, e.g., a first event can be considered as residing at a tail of the event stream and a most recent event can be regarded as residing at the head of the stream with other events ordered between the tail and the head of the stream. The events need not be stored in contiguous storage locations to be logically sequenced in the stream representation, e.g., a first event can be stored on a first disk, a second event on a remotely located second disk, and a third event stored at a further remote third disk, the stream can logically sequence the first, second, and third events by reference to their stored data in different physical locations, the ordered event stream (OES) can be regarded as an abstraction enabling ordering of the events comprised in the stored data, e.g., the stored events can be regarded as being ordered according to the OES, thereby enabling writing, reading, or other event operations, to occur according to the ordering of the events. It is noted that some stream storage systems can employ an alternative head/tail terminology, for example, a first event can be added at a head of an OES, while subsequent new events can then be added sequentially to a tail of the OES, however, this is indistinguishable in all other ways from the head/tail convention generally employed in the instant disclosure, e.g., an event is still part of a sequence of events and corresponds to a key as disclosed elsewhere herein.

Every event of a stream can be associated with a routing key, or simply key for convenience, typically a hashed routing key. A key can often be derived from data of the event, e.g., a "machine-id," "location," "device type," "customer number," "vehicle identifier," etc., corresponding to the information of the event. In one or more embodiments, an event can be associated with a key, however, data yet to be written to an event can be associated with an access target value that can be the same value as the key, e.g., the access target value can be determined based on the data of the event, a characteristic corresponding to the event to be recorded, etc., such that the access target value can be regarded to be the same as the key. Accordingly, the term event key, hashed key value, access target value, key, etc., can be used interchangeably for convenience unless the context indicates a more specific use, for example, an access target value can correspond to data to be stored in an event and can be derived from data or other characteristics corresponding to the data, such that when the event is stored, the access target value can be used as the key associated with storing the event. Similarly, in a read operation, an access target value can be indicated to allow access to an event having a key that matches the access target value because the event was written to the OES according to a key that can be the same as the access target value. Generally speaking, the term access target value can relate to a 'key's value,' such that access to events of an OES can be based on comparing the access target value to key values for actual stored events, where an existing event is to be read, or key values that will be used to store an event, where an event will be written into the OES at the access target value. Again, it is generally easier to just use the term key for both access target value and routing key, unless more specificity is needed in an example, and this convention is generally used in the instant disclosure for simplicity and brevity. Events with the same routing key can be written to a corresponding stream or stream segment, and can also be consumed, e.g., read, in the order they were written to the stream or stream segment.

A stream can be comprised of a group of portions, e.g., shards, partitions, pieces, etc., that can generally be referred to as stream segments, or simply segments for convenience. The segments can act as logical containers for one or more events within a stream, e.g., it is understood that events written to geographically disparate data storage devices can logically be written to the same stream segment, e.g., same logical container, according to the instant disclosure. When a new event is written to a stream, it can be stored to a segment of the stream based on a corresponding key. Event routing keys can be hashed to form a 'key space.' The key space can be employed to divide the stream into a number of parts, e.g., segments. In typical embodiments, consistent hashing can be employed to assign events to appropriate segments. As an example, where a stream comprises only one segment, all events to be written to the stream are written to the same segment in an ordered manner and the segment corresponds to the entire key space. As another example, where a stream comprises two parallel segments, the key space of the event, e.g., from zero to 'n', can be associated with the two segments, however each of the two segments can be associated with a portion of the total key space, for example, the first segment can store events of time t with a key between zero and 'm' and the second segment can store other events of time t with a key between 'm+1' and 'n'. It will be appreciated that more segments can serve to further divide the key space such that a segment can store an event with a key falling within the range of the key space associated with that segment. As an example, a four-segment event stream can have each segment store data at time t for a quarter of the total key space, e.g., segment A can store events with keys from 0 to <0.25, segment B can store events with keys from 0.25 to <0.5, segment C can store events with keys from 0.5 to <0.75, and segment D can store events with keys from 0.75 to 1.0.

In one or more embodiments, a segment of an event stream can typically be associated with a single processing instance, e.g., one processor, one cooperating group of processors, etc., to assure ordering of the events stored in the segment. A processing instance can be a single real physical processor, a virtualized processor instance executing on one or more real physical processors, a group of real physical processors, a group of virtual processor instances executing on one or more real physical processors, etc. As an example, a processing instance can be embodied via a blade server in a computing facility. As another example, a processing instance can be a virtual processor deployed in an elastic computing system, e.g., a 'cloud server,' etc. Typically, a processing instance can be associated with a level of performance which, in some embodiments, can be measured via one or more key performance indicators (KPIs) for the processing instance. As an example, a first blade server can have a first level of performance and a second blade server can have a second level of performance. In this example, where the two blade servers can comprise similar hardware and environments, they can have similar levels of performance. However, also in this example, where the two blade servers comprise different hardware and/or are in different environments, they can have different, sometimes substantially different, levels of performance. As an example, a first processing instance can perform one unit of work, a second processing instance can perform one unit of work, a third processing instance can perform five units of work, a fourth processing instances can perform three units of work, etc., where the unit of work can correspond to a number of event stream operations that can be performed by the processing instances, e.g., reads, writes, etc. In this example, the first and second processing instances can perform similar amounts of work in an event stream storage system, while the third processing instance can be capable of up to five times the work of either the first or second processing instance.

Generally, the computing resources of a processing instance can be associated with costs, e.g., monetary costs, electrical consumption costs, dispersion of generated heat costs, support costs, real estate for deployment costs, operations per unit time as a cost, etc. As such, selecting an appropriate processing instance can be associated with optimizing cost. As an example, if an event stream typically consumes less than one unit of work, then pairing the stream with a processing instance that can perform one unit of work can be deemed a better use of computing resources, e.g., lower overall aggregate costs, etc., than pairing the even stream with a processing instance that can perform 200 units of work which can result in wasting up to 199 units of work through underutilization. Moreover, in this example, the 200-unit processing instance, for example, can be a newer high end processing instance that can have a high monetary cost, and generate more heat than the one-unit processing instance that, for example, can be a low-cost commodity processing instance that is plentiful, has a low monetary cost, and is already widely deployed. As such, paring the one unit of work event stream with a racecar of a performance instance can be understood as possibly not being an optimal pairing in comparison to a more pedestrian performance instance.

In various embodiments described herein, scaling technology employed in a stream data storage system can improve a stream data storage system, such as by scaling an OES to comprise one or more segments that can improve use of computing resources in contrast to a conventional unscaled stream data storage system. In one or more example embodiments, a portion of a stream, e.g., an OES or portion thereof, can be divided evenly to distribute the work corresponding to event operations, e.g., splitting a stream in to two subsequent similar portions can, for example, enable use of two processors in parallel rather than one processor. This can be regarded as a form of 'symmetrical scaling' of an event stream. Alternatively, a stream can be split into dissimilar portions, regarded as a form of 'asymmetrical scaling,' that can result in portions that are dissimilar, e.g., one resulting segment can correspond to a greater or lesser key space than a second resulting segment, etc. In some embodiments, symmetric and asymmetric scaling can be performed on one portion of an OES and can result in two or more subsequent other portions of the OES, for example, symmetrical scaling of a stream into three or more similar portions, etc. In one or more embodiments, these other portions can also comprise a mix of symmetric and asymmetric splits of the stream, for example, a first portion of a stream can be split into a second, third, and fourth portion, wherein the second and third can be similar, e.g., symmetric, and the fourth portion can be dissimilar from the second or third portion, e.g., asymmetric. In this example, the scaling can be referred to as 'mixed scaling,' e.g., implying that the subsequent portions of the stream after scaling can comprise a mix of symmetric and asymmetric portions, see the various example symmetric scaling changes to segments of an example OES illustrated in FIG. 2.

Scaling of the event stream can be in response to a threshold consumption of computing resources, e.g., when a threshold work level is traversed, an event stream can be scaled. In one or more embodiments, scaling can generally be associated with allocating computing operations to logical portions of an ordered stream of events. As an illustrative example, first processor(s) can satisfactorily write 5000 events per unit time to an ordered event stream, e.g., into storage corresponding to the ordered event stream, however, where the rate of events to be written to the stream, for example, doubles to 10000 events per unit time, the first processor(s) can be determined to be underperforming due to being overly burdened and it can be desirable to scale the OES to compensate for overburdening of the first processor(s). As such, scaling can add second processor(s) such that the load on the first, and now the second, processors can be similar, e.g., the writing of the example 10000 events per unit time can be managed by two or more processor after the scaling rather than just the first processor(s) before the scaling of the OES. As noted elsewhere herein, the scaling can be symmetric, asymmetric, or mixed scaling. It can be further noted that symmetric scaling of a key space can result in non-symmetric loading of a computing resource(s). As an expansion of a previous example, where a first processor(s) writes 5000 events per unit time to event keys between 0 and 0.5 of a key space, and this load doubles as a result of an additional 5000 writes with an event key between 0 and 0.1 of the key space, then scaling the OES by symmetrically dividing the key space between the first processor(s) from 0 to 0.25 and the second processor(s) from 0.25 to 0.5 of the key space should not result in a symmetric division of computer resource loading, e.g., the first processor(s) would now address a portion of the initial 5000 events and an additional burden from the 5000 events between 0 and 0.1 of the key space, while the second processor(s) would address the initial 5000 events less the portion still being managed by the first processor(s), but would not get any part of the additional 5000 events. As such, mere equal key space division of a portion of an OES that is ignorant of the distribution of work across the key space of the event stream can be less effective that might otherwise be imagined. Improved scaling technologies can be considerate of a resulting workload and can, for example, accommodate asymmetric scaling of a portion of an OES based on a key space characteristic(s), such that resulting workloads can be distributed to available computing resources in a more tailored manner, e.g., a scaling vent can have asymmetric key space scaling that can result in symmetric computing resource use, etc. Moreover, advanced scaling techniques can perform scaling intelligently, e.g., based on indications received from a user, administrator, analytics component, optimization engine, etc., to selectively burden a portion(s) of available computing resources according to a performance, capability, metric, etc., of an individual portion(s) of the available resources, e.g., adding an additional mid-range processor can result in a different scaling than adding another high-end processor. Optionally, scaling can also be selectively deferred, wherein the deferral can reduce consumption of computing resources, e.g., committing a scaling event can consume computing resources so it can be desirable to scale in response to determining that the scaling would beneficial over and above any use of computing resources to commit the scaling event itself.

In contrast to conventional storage systems, the disclosed subject matter can relate to migrating data from a legacy data storage system into an OES data storage system via a type of OES termed a 'vintage OES (VOES)' that can store legacy data and new data in different portions of the VOES. The migration of data via the VOES can reduce disruption to data access in contrast to conventional data migration techniques, for example, by allowing migration to complete based on the time to migrate legacy data rather than on the time to migrate legacy data and new data occurring during the migration operation(s). Embodiments of the disclosed subject matter can support migration of data from other streaming storage systems or from other non-streaming storage systems. Migration from non-streaming storage systems, typically termed 'unstructured storage systems' can comprise analysis of data to be migrated and subsequent sequencing of data in to ordered events in destination VOES. Sequencing of events corresponding to data to be migrated from unstructured storage systems can, in some embodiments, be based on a data order indicated by the unstructured storage system, e.g., data migrated in from 'trusted unstructured storage', while in other embodiments, the sequencing can be based on a data order analysis for the data to be migrated, e.g., data migrated in from 'untrusted unstructured storage.' VOES can undergo scaling, including auto-scaling events, etc., and, in some embodiments, can employ one or more event operation constraints in a VOES epoch(s). Moreover, VOES can be associated with functionality not generally resident in typical OES systems and, accordingly, an OES application programing interface (API) can be extended to include VOES function calls or can operate in conjunction with a VOES API component to enable migration related function calls and programming.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate migrating legacy data into an ordered event stream (OES), in accordance with one or more embodiments of the subject disclosure. System 100 can comprise a storage component 102 that can store one or more OESs, e.g., OES 110, etc. Generally, OES 110 can store one or more events. An event is associated with a key, e.g., a routing key. A key can typically be determined from aspects of the corresponding event, although other key determination techniques can be employed. As an example, a key can be based on a characteristic of the source of the event data, such as a customer identifier, machine identifier, a location of a device providing the event data, a type of a device providing the event data, etc. Events with a same key can be written into OES 110 in an ordered manner according to the key. Similarly, events with a same key can be read from OES 110 in an ordered manner, e.g., in the order they were previously written into OES 110. Components providing events to be written can be termed 'writers' and components requesting events can be termed 'readers.' As such, a writer can provide an event that can be written to OES 110 in an ordered manner based on a key associated with the event. Similarly, a reader can receive an event from OES 110 based on a key.

Processor component 104 of a system 100 can receive write(s) 106 that can be written to OES 110 stored on storage component 102. Processor component 104 of a system 100 can provide access to events of OES 110 based on a key, e.g., as read(s) 107 that can be communicated to a reader. Generally, one processing instance, e.g., processor component 104, etc., is designated for writing events to a portion, e.g., segment, of OES 110. OES 110 can comprise one segment and/or parallel segments, e.g., stream segments, etc., that can store events according to a key. In an example embodiment, more than one processing instance writing to a segment of an OES can typically be disfavored because it can increase the difficulty of writing incoming events in an ordered manner. However, a given processing instance can read/write to more than one OES segment, e.g., a given processing instance can write to one or more OESs, to one or more segments of one OES, to one or more segments of one or more OESs, etc. In an example embodiment, while more than one processing instance writing to a segment of an OES is typically disfavored, more than one processing instance reading from a segment can be fully supported, encouraged, etc. As such, for a given number of segments, in some embodiments, there can be up to the same number of processing instances, e.g., to limit more than one processor instance writing to a segment. Although adding more processing instances can be allowable, for example to increase read operations, these additional processing instances can be constrained to read operations to limit the possibility of scrambling an order of events being written to a segment. It is further noted that system 100 can comprise idle processing instances that are not reading or writing to the OES, for example, as reserve processing instances supporting failover operations protecting against an active processing instance becoming less responsive, in support of scaling events, etc. In one or more embodiments, keys of one or more segments of an OES can represent a key space for OES 110. Segments can therefore act as logical containers associated with a particular range of keys for a portion of an event stream and can be used to store events of OES 110. When a new event is written to a stream, it can be logically stored to a segment based on the event key regardless of where it is physically stored. In an example embodiment, the key space can be divided into a number of ranges that can correspond to the number of segments comprising an OES, e.g., OES 110. As an example, a key space for an OES can be from 0 to 100, the OES can comprise two parallel segments wherein the first segment can sequentially store events with, for example, keys from 0 to 30, and the second segment can sequentially store events with keys from >30 to 100. In this example, a first event with a key of 54 can be appended to the second segment, a second event with a key of 29 can be appended to the first segment, a third event with a key of 14 can be further appended to the first segment after the second event, etc. In an example embodiment, storage component 102 can store one or more OESs, although only OES 110 is illustrated for clarity and brevity.

OES 110, as illustrated in system 100, can be an overly simplistic example of an OES that can comprise just one segment for storing incoming event write(s) 106 and sourcing event read(s) 107, and therefore the key space of OES 110 can be embodied in the illustrated single segment of events, e.g., the key space of OES 110 is not illustrated as being distributed across more than one parallel event storage segment. OES 110 can have an origin terminus 112. Whereas the reader of this document is expected to understand that the OES represents a logical ordering of events actually stored on physical storage devices, the instant disclosure will generally simply refer to logically writing to an OES as writing to an OES for the sake of brevity. A first event can be written at origin terminus 112. The subsequent events can then be appended at an additive terminus 114 that is typically always at the head of the stream of written ordered events, e.g., a most recent event is written to the head of OES 110, which provides ordering of the events being written. This results in OES 110 allowing for continuous and unbounded data storage that can be a durable, elastic, append-only, unbounded sequence of events, e.g., an OES can logically represent events stored at any number of physical storage locations, e.g., spanning files, spanning disks, spanning data centers, etc. In an example, a $(K+1)^{th}$ event can be appended to the $K^{th}$ event of OES 110 at additive terminus 114. In an embodiment, storage component 102 can store any number of OESs. Moreover, any one OES can comprise any number of parallel segments, e.g., strings of events for a defined key space range. Each segment can comprise an ordered sequence of stored events.

In system 100, legacy data migration component (LDMC) 120 can facilitate migrating data into a vintage ordered event steam (VOES) from another data storage system. In embodiments, the other data storage systems can be another stream storage system, a trusted unstructured storage system, an untrusted unstructured storage system, or other data storage system. In an embodiment, a VOES can comprise events migrated from a legacy data storage system in addition to new events corresponding to data that would have been written to the legacy storage system prior to the start of the migration operation(s). Accordingly, in comparison to a legacy storage system that continues to write events to the legacy system during a migration, the VOES can be less disruptive to data access operations. Moreover, the disclosed subject matter can avoid deferring writing of new events that can be associated with conventional migration techniques. As an example, a legacy system can suspend writes while it is being migrated, which can result in a need to buffer incoming data, can result in loss of data, etc., during migration operation(s).

A VOES can support writing legacy and new events, e.g., migrating legacy data and writing new events during a migration operation. This can avoid loss of new data, avoid needing to buffer new data during migration, and can shorten overall migration time to be thereby less disruptive to data access as a result of migration from a legacy system to a OES system. Moreover, in contrast to writing new events for a legacy storage system to a first OES and migrating legacy data to events of a separate second OES, employing a VOES topology as disclosed elsewhere herein, can facilitate enable function calls to the VOES to access either legacy or new events, e.g., a single VOES namespace can be employed rather than employing both a 'legacy system migrated event' namespace and a 'legacy system new event' namespace. This feature can simplify user/system interaction with 'migrated legacy data' now in a stream format, in contrast to conventional systems and techniques. In an embodiment, a VOES API, can facilitate use of a VOES incorporated into an existing OES data storage system, e.g., an existing OES data storage system can be readily enabled to support VOES technology. As an example, LDMC 120 can support processor component 104 to support a VOES enabling migration of legacy data from another data storage system via a VOES API and existing event operations, e.g., write(s) 106, read(s) 107, etc., to an OES, e.g., OES 110, etc., that can support a VOES topology, as stored via storage component 102, etc. Further detail of the disclosed subject matter can be illustrated in more detail hereinbelow.

Figure 2:
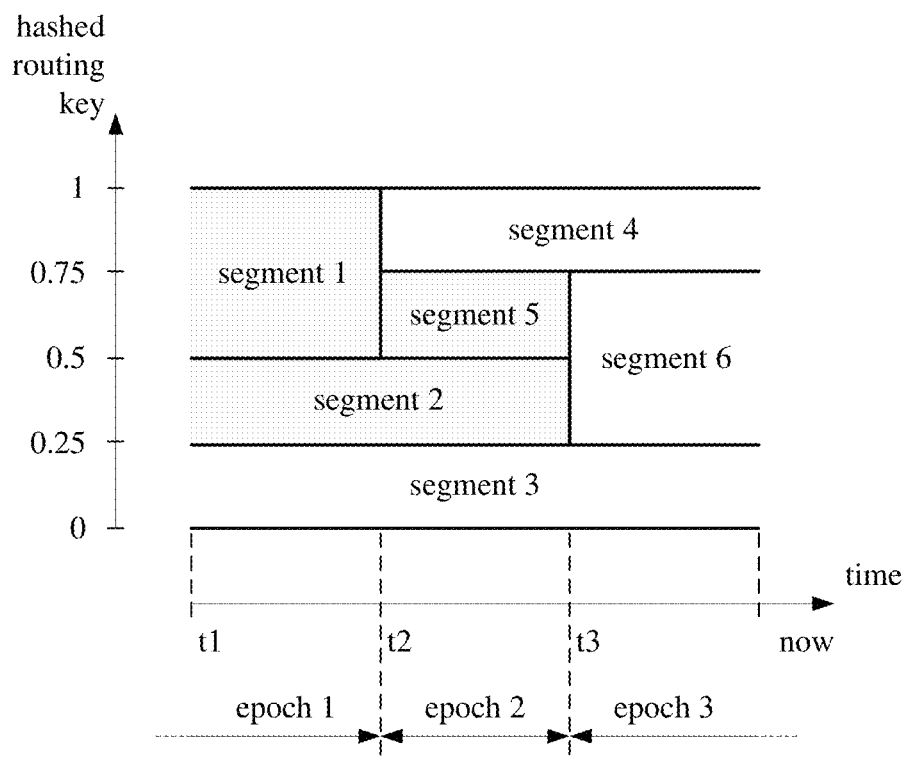
FIG. 2 is an illustration of one example embodiment that can enable migrating legacy data into a scalable OES.

FIG. 2 is an illustration of an example system enabling migration of legacy data into one or more segments of an ordered event stream (OES) in accord with applying epoch transitions to the topology of the OES, in accordance with one or more embodiments of the subject disclosure. Generally, an OES can comprise segments corresponding to a key space topology, e.g., key space 200, etc. At a first time, for example t1, key space 200 can correspond to one or more parallel segments, e.g., segment 1, segment 2, segment 3, etc. At some point a segment of the corresponding OES can be scaled. As an example, at t2, segment 1 can be scaled up. This can result in causing segment 4 and segment 5 in key space 200 and correspondingly sealing segment 1 therein. The topology of the OES comprising segments 1-3 pre-scaling, and the corresponding key space up to time t1, can be designated as epoch 1. Similarly, the topology of the OES comprising segments 4-5 and 2-3, and the corresponding key space between t1 and t2, can be designated as epoch 2, etc. It is noted that the tight relationship between segment(s) of an OES and the corresponding portions of a key space of the OES can often result in mixing of the terms 'OES' and 'key space,' e.g., key space 200 can often be referred to as 'OES 200' for the sake of brevity. Such noted conventions are used hereinbelow for the sake of brevity, e.g., key space 200 can be referred to as and OES 200 hereinbelow even where such nomenclature is technically less correct, unless implicitly or explicitly indicated otherwise, e.g., the reader of this disclosure is expected to appreciate the tight coupling between a key space and the corresponding OES is such that it is less wordy to simply refer to key space 200 as illustrating the logical arrangement of OES segments as 'OES 200.'

In an example embodiment, segments 2 and 3 can be continuous across epochs 1 and 2 while segment 1 can end at the transition from epoch 1 to 2. In an example embodiment, in epoch 1, events associated with a key between 0.5 and 1, e.g., $0.5<key\leq1$, can be written (and read from) segment 1, while in epoch 2, events associated with a key between 0.75 and 1, e.g., $0.75<key\leq1.0$, can be written (and read from) segment 4 and events associated with a key between 0.5 and 0.75, e.g., $0.5<key\leq0.75$, can be written (and read from) segment 5. As such, access to events for a given key can be associated with reads in different epochs. As an example, reading an event with a key of 0.8 can read from both segment 1 and segment 4. Where the read is from head to tail, the read of example events with a key of 0.8 can begin reading in segment 4 and then continue reading into segment 1 across the epoch boundary between epoch 2 and 1. Similarly, where the read is from tail to head, events associated with the example key of 0.8 can begin in segment 1 and continue into segment 4 across the epoch boundary. However, it is noted that generally no additional events are written into segment 1 after the scaling event is committed and a new epoch is begun.

In epoch 2, the topology of OES 200 can comprise segments 4-5 and 2-3. At some point further scaling can be undertaken, e.g., at t3. OES 200 can, for example, scale down by condensing segment 2 and 5 into segment 6 at t3. This example scaling down can reduce a count of segments comprising OES 200. The scaling at t3 can result in ending epoch 2 and beginning epoch 3. The example scaling can use segment 6 and can close segments 2 and 5. As such, in epoch 3, the topology of the OES comprising segments 3-4 and 6 post-scaling can distribute the key space of OES 200, for example, as $0<segment\ 3<0.25$, $0.25>segment\ 6\leq0.75$, and $0.75>segment\ 4\leq1.0$.

In an example embodiment, where data is migrated from another data storage system in to an OES, the migrated data can be organized by key when written as events into an OES. As an example, legacy data can comprise information for rideshare services offered in two cities, e.g., cities A and B, whereby migration of that information into events of an OES, e.g., a VOES, can include use of two different event keys, for example, a first key corresponding to city A and a second key corresponding to city B, such that information for ride shares for city A can be written as legacy events in a first segment, e.g., segment 1, and for city B in a second segment, e.g., segment 2. In another example, the keys for cities A and B can be in other segments, in the same segment, etc. In an embodiment, a vintage OES can support scaling events, e.g., use of epochs. Moreover, in some embodiments, an epoch can also be employed to demark between migrated events and new events corresponding to the legacy data storage system, as is illustrated in more detail elsewhere herein.

Figure 3:
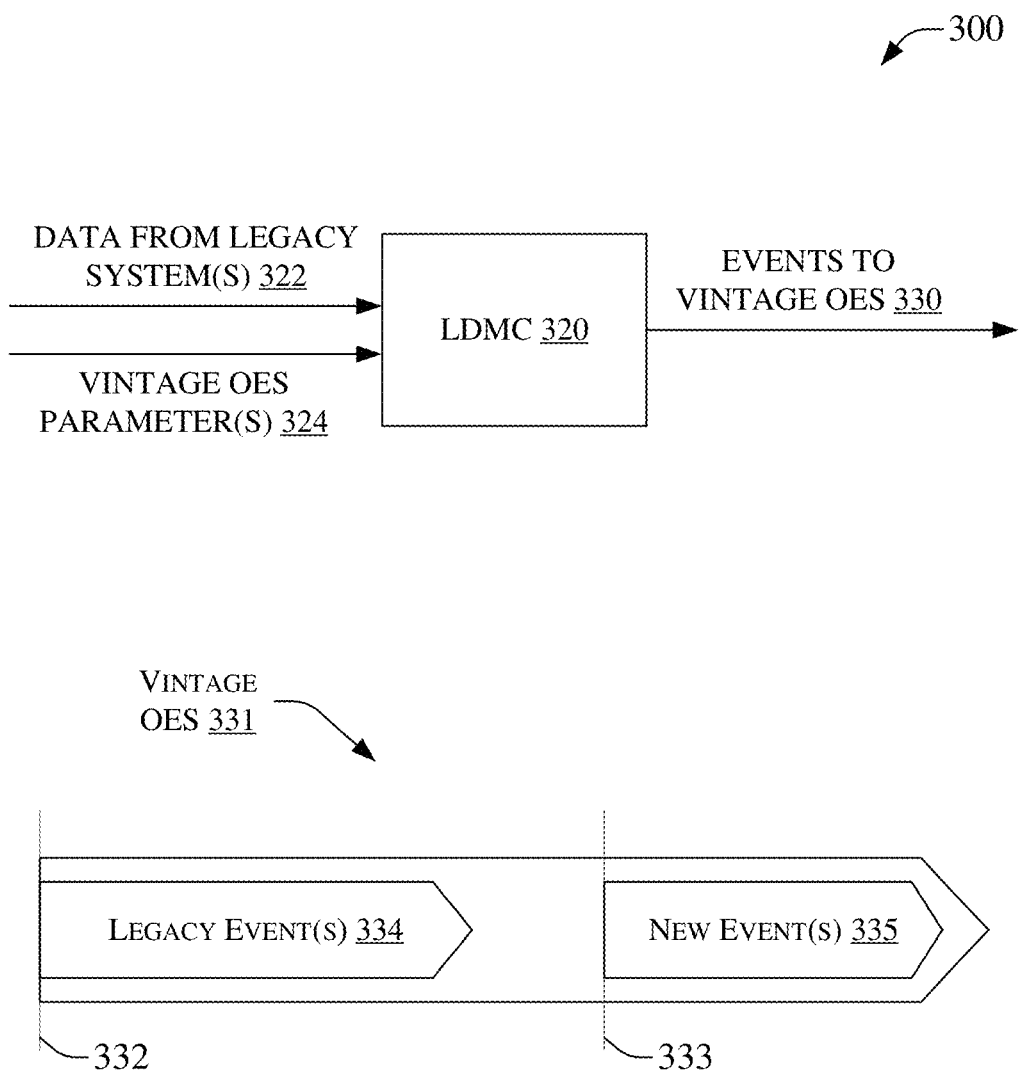
FIG. 3 is an illustration of an example embodiment that can support migrating legacy data into a vintage OES (VOES).

FIG. 3 is an illustration of a system 300, which can facilitate migrating legacy data into an ordered event stream (OES) via use of a vintage OES, in accordance with embodiments of the subject disclosure. System 300 can comprise LDMC 320 that can be the same as, or similar to, LDMC 120, etc. LDMC 320 can receive data from legacy system(s) 322 and can generate events to vintage OES 330. The events to VOES 330 can be according to VOES parameter(s) 324, for example, a topology of a key space of a VOES, e.g., key space 200, etc. A VOES, e.g., VOES 331, etc., can comprise events to VOES 330, which can comprise legacy event(s) 334, new event(s) 335, or a combination thereof. In some embodiments, legacy data can be complete, e.g., no new data can be written to the legacy system during the pendency of migration to VOES 331. In these embodiments, VOES 331 can comprise only legacy event(s) 334 written from point 332, e.g., point 332 can indicate a start of events of VOES, that can be the same as, or similar to origin terminus 112 of system 100. In other embodiments, a legacy data storage system can continue to have new data incoming that would be written to the legacy data stored but, instead, can be redirected to VOES 331 as new event(s) 335.

VOES 331 illustrates new event(s) 335 as being written from point 333. It is noted that this option can be distinct from comingling new event(s) 333 with legacy event(s) 334 as they are being written from point 332. Were new event(s) 333 to be comingled, then the ordering of the vintage ordered event stream could be impaired, or at least more complicated to achieve. However, new event(s) 335 can be written from point 335, which can be regarded as a type of origin terminus 112, albeit within an existing OES already having a first origin terminus, e.g., VOES 331 can be treated as having two origin termini, where point 332 is a first origin terminus for legacy events 334 and point 333 is a second origin terminus for new events 335. In some embodiments, point 333 can simultaneously act as a (K+1)th additive terminus 114 for K legacy events in legacy event(s) 334. Accordingly, vintage OES 331 can write legacy event(s) 334 from point 332 and can write new event(s) 335 from point 333, then, upon completion of the migration of legacy data, can create a link from a final event of legacy event(s) 334 to the first event of new event(s) 335, thereby forming VOES 331 with continuity.

In an embodiment, the stream of events in VOES 331 can represent data stored in one or more physical data stores that may not be continuous, however, typically blocks of storage can be a convenient manner of storing ordered events, e.g., it can be a more efficient use of computing resources to serially physically store data for sequential events to reduce seek times, that can be associated with accessing data physically stored out of order. As an example, storing ten sequential events in contiguous physical storage space can facilitate reading from the start to the end of the physical storage space without needing to seek starting points for each of the ten events. However, whereas OESs can employ various physical stores, for example to provide unbounded storage space, there can be links between the physical end of one event and the physical start of another event despite the logical representation of the OES appears to be a continuous ordered string of event, for example, where an OES physically stores events one to K on a first hard drive and physically stores events K to (K+M) on a second hard drive, the events are clearly physically not continuous from one to (K+M) despite the corresponding logical representation of the OES indicating that there is continuity from one to (K+M). In this example, there is a link between the end of event K and the start of event (K+1) to allow event operations to transition from event K to event (K+1) seamlessly. Generally, the fewer links between noncontiguous physical storage locations, the more efficient event operations can be, for example, by avoiding seek times for next event start physical locations. As such, linking between an ending terminus for legacy event(s) 334 and point 333 marking the start of new event(s) 335 in VOES 331 can be a straightforward matter.

In an embodiment, storing migrated events, e.g., legacy events, new events corresponding to a legacy data storage system, etc., in VOES 331 can be beneficial by providing a single namespace for event operations corresponding to the legacy data storage system. As an example, if a legacy data storage system is migrated as a first OES for legacy events and a second OES for new events directed to the legacy system during migration, then there can result two namespaces for events of the legacy data storage system. This can lead to using function calls to both namespaces to perform operations on the legacy data storage system data after migration. However, this can lead to improper ordering of events, e.g., reading some new events prior to some legacy events, etc. Moreover, this can illustrate an increase in the complexity of programing by storing data for one legacy data storage system into two OESs after migration. In contrast, illustrated example VOES 331 can provide access to both legacy and new events, e.g., 334 and 335, via a single namespace, e.g., VOES 331. This can reduce complexity of API function calls, can maintain proper ordering of events, e.g., legacy event(s) 334 can occur prior to new event(s) 335, etc., and can be a readily appreciated improvement over conventional techniques.

In an embodiment, data from legacy system(s) 322 can comprise one or more of data from other stream data storage systems, data from other non-stream systems that can comprise trusted ordering information, data from other non-stream systems that can comprise untrusted ordering information or no identified ordering information, etc. Accordingly, migration to event(s) of an OES data storage system can, in some embodiments, comprise analysis of legacy, ordering of events resulting from the legacy data, etc. In this regard, legacy data from a non-stream system can, in some embodiments, undergo rewriting into an OES, e.g., VOES 331. In some embodiments, for example migrating data from a legacy stream system, events can be simply copied into the new OES system, or in some particular circumstances, can remain unchanged. As an example, where an OES data storage system is already employed to store an OES for a customer according to a first OES product, the OES can be stored via a via a bulk data store, e.g., storage component 102, etc. In this example, where the customer, for example, upgrades to a second OES product and that second OES product can also be supported via the same bulk data store, e.g., storage component 102, then migrating the legacy events from the first OES product to the second OES product can, perhaps, completely avoid any rewriting of event data and migration can be extremely fast, for example only consuming enough time to generate VOES 331 pointing to the legacy data already written to the example storage component 102. In an interesting example, a large customer can maintain their own storage space and can run an OES data storage product using their own storage space, wherein legacy data can, in some instances already be in a sequential event format and migration can be very fast. However, more typically, use of a VOES can comprise re-/writing legacy event(s) 334 from a first physical storage location to a second physical storage location, for example, from a customer data center to a OES provider data center. In some instances, this can comprise converting from non-OES event data formats on a customer data store to an OES event data format on the same customer data store. In other examples, the migration of data can occur between different physical data stores in one location, more than one location, into a virtualized environment that can store events across multiple locations, e.g., via the 'cloud,' etc., all without departing from the scope of the instant disclosure. Details of these and other examples are illustrated elsewhere herein.

Figure 4:
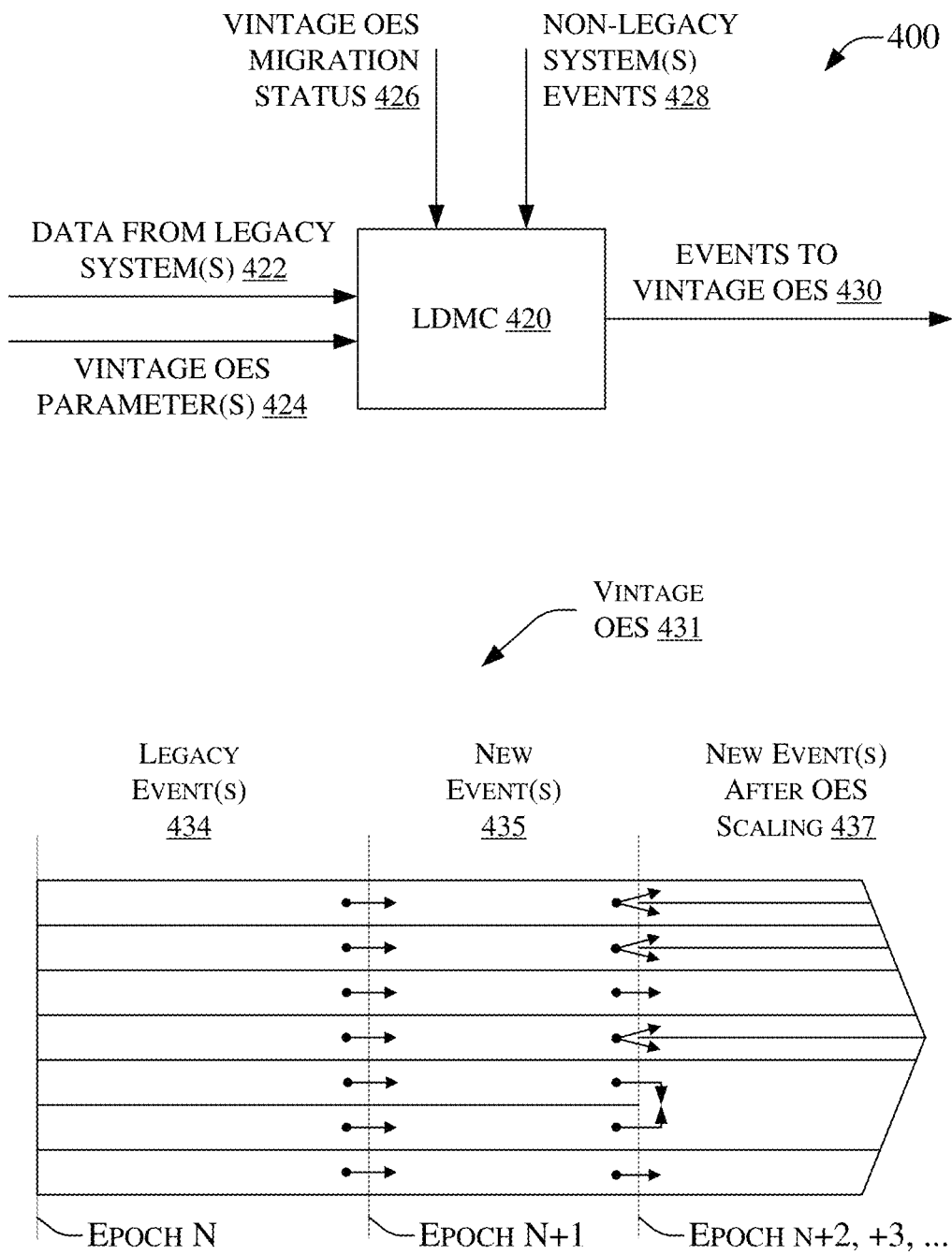
FIG. 4 is an illustration of one example embodiment that can enable segment linking for a VOES.

FIG. 4 is an illustration of a system 400 that can enable segment linking across epoch boundaries for a vintage ordered event stream (VOES), in accordance with embodiments of the subject disclosure. System 400 can comprise LDMC 420 that can be the same as, or similar to, LDMC 120, 320, etc. In an embodiment, LDMC can receive data from legacy system(s) 422 and can generate events to VOES 430 in accord with VOES parameter(s) 424. In an embodiment, LDMC 420 can further receive VOES migration states 426. In some embodiments, LDMC 420 can further receive non-legacy system(s) events 428, e.g., events that, due to a completion of migration operation(s), can be events for inclusion in a VOES but are more properly named as non-legacy system(s) events 428 because they are no longer actually directed to a legacy data storage system. In an embodiment, VOES migration status 426 can indicate completion of a migration operation(s). In an example, new events(s) 435 can comprise data from legacy system(s) 422 prior to an indication via VOES migration status 426 and can comprise non-legacy system(s) events 428 after the indication via VOES migration status 426.

Events to VOES 430 can result, for example, in VOES 431. VOES 431 can comprise legacy event(s) 434 in several segments beginning at the point indicated by epoch N. New events directed to the corresponding legacy system during the migration to VOES 431 can occur in the segments for new event(s) 435 from epoch N+1. The indicated links between legacy events(s) 434 and new event(s) 435 can be generated upon an indication that legacy events have been properly migrated to VOES 431, e.g., after all legacy events have been migrated, the legacy event(s) 434 segments can be linked, via the arrows between epoch N and epoch N+1, to new events that were written into new event(s) 435 segments. This can mirror VOES 331 but can further reflect joining legacy event(s) 334 to new event(s) 335 after all legacy event(s) 334 have been migrated to VOES 331, e.g., legacy event(s) 434 comprises all of the migrated legacy events and then logically connects the OES, e.g., AOES 431, to the new event(s) 435 that were previously directed to the legacy system during the migration. In this example, events occurring after the linking of legacy event(s) 434 to new event(s) 435 can be added to an additive terminus of new event(s) 435 and can correspond to non-legacy system(s) events 428, e.g., the legacy data storage system can be regarded as retired and no events within the purview of AOES 431 would be directed to the legacy system after the migration is completed, as can be indicated via VOES migration status 426.

VOES 431 further illustrates additional epochs, e.g., epoch N+2, +3, . . . These epochs can correspond to new event(s) after OES scaling 437. Accordingly, AOES 431 is capable of being scaled, much the same as any other OES, for example, as is disclosed hereinabove. As an example, a small widget manufacturer can employ a first data storage system. This small widget manufacturer can decide to begin using an OES product and migration from the example first data storage system can be undertaken. During this example migration, data from the first data storage system can be migrated as legacy event(s) 434 into VOES 431. During the migration, new small widget manufacturer data can be written as new event(s) 435. Upon migration of all of the legacy data, legacy event(s) 434 can be linked to new event(s) 435, and VOES migration status 426 can indicate that the migration is complete. Thereafter, in this example, small widget manufacturer data can be received as non-legacy system(s) events 428 and can be written to the additive terminus of new event(s) 435. After a time, small widget manufacturer can grow in size to become medium widget manufacturer. The growth from small widget manufacturer to medium widget manufacturer can correspond to scaling VOES 431 and progressing from epoch N+1 to epoch N+2, and the segments for new events 435 can be linked to different segments for new event(s) after OES scaling 437.

In an embodiment, epoch N for legacy event(s) 434 can reflect 'sealing' of the segments comprising migrated legacy data. In this regard, data that was migrated from a previous format to a next format consistent with VOES 431 can be segregated to an epoch, e.g., epoch N. Data that was written as a new event to VOES 431 can therefore occur in another epoch, e.g., epoch N+1, N+2, N+3, etc. To this end, the change in epoch from N to N+1 can be a result of sealing the legacy event(s) 434 portion of VOES 431, rather than from scaling of VOES 431, such as the evolution from epoch N+1 to N+2, etc. In some embodiments, the change in epochs, e.g., from N to N+1, can correspond to using a more archival form of storage for legacy event(s) 434, for example, storing events via static chunks in a geographically diverse data storage system, wherein, for further example, the chunks can be convolved, XOR'ed, etc., subject to erasure coding, etc., which can provide redundancy against data loss, conserve storage space, etc. However, these details are generally outside the scope of the instant disclosure and are not further discussed for the sake of clarity and brevity, although all such uses of archival storage is regarded as being within the scope of the instant disclosure. It is further noted that sealing, for example, epoch N, etc., does not require archiving of migrated legacy data.

Figure 5:
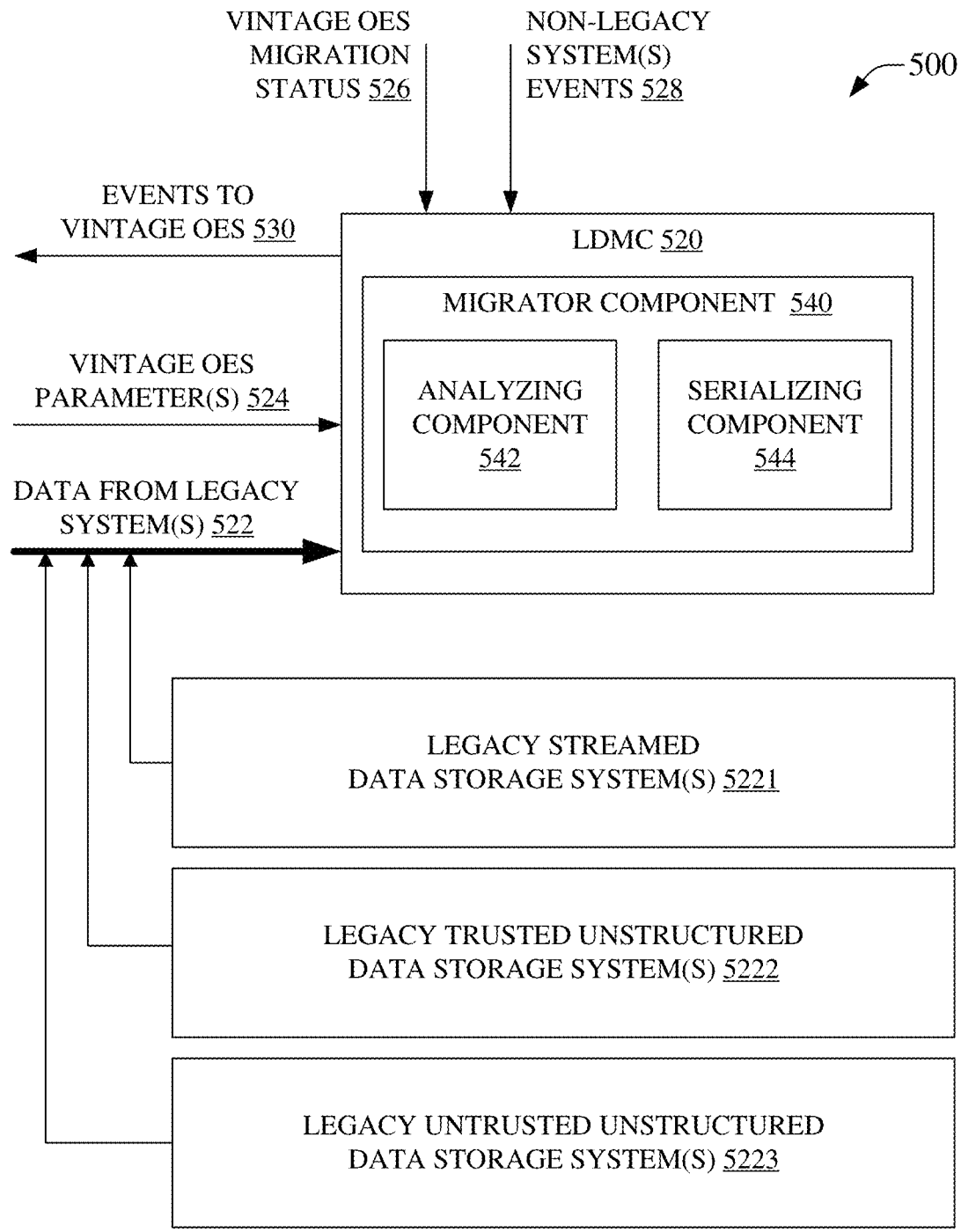
FIG. 5 is an illustration of an example embodiment that can facilitate migrating legacy data from different types of legacy data sources.

FIG. 5 is an illustration of a system 500, which can facilitate migrating legacy data from different types of legacy data sources into an ordered event stream (OES), in accordance with embodiments of the subject disclosure. System 500 can comprise LDMC 520 that can be the same as, or similar to, LDMC 120, 320, 420, etc. In an embodiment, LDMC can receive data from legacy system(s) 522 and can generate events to VOES 530 in accord with VOES parameter(s) 524. In an embodiment, LDMC 520 can further receive VOES migration states 526. In some embodiments, LDMC 520 can further receive non-legacy system(s) events 528. In an embodiment, VOES migration status 526 can indicate completion of a migration operation(s). In an example, new events to VOES 530 can comprise events based on data from legacy system(s) 522 prior to an indication via VOES migration status 526 and can comprise events corresponding to non-legacy system(s) events 528 after the indication via VOES migration status 526.

Data from legacy system(s) 522, as illustrated in system 500, can comprise legacy streamed data storage systems(s) 5221, e.g., data/events from other ordered event stream data storage systems. In an embodiment, this can comprise prior versions or other stream data storage systems of a first storage service provider. In other embodiments, this can comprise stream data storage systems from a second storage service provider, for example a competing storage service provider. Further, data from legacy system(s) 522 can comprise legacy trusted unstructured data storage system(s) 5222, that can store data in formats other than in a stream format. A legacy trusted unstructured data storage system(s) 5222 can provide an indication of ordering data that can be trusted and can therefore be employed in generating ordered events comprising events to VOES 530. This can differ from legacy untrusted unstructured data storage system(s) 5223, that can be comprised in data from legacy system(s) 522, and can either provide ordering information that is not trusted or can fail to provide ordering information.

In regard to legacy trusted unstructured data storage system(s) 5222, serializing component 544 can employ a trusted ordering indicator to provide facilitate ordering of events comprised in events to VOES 530. However, in regard to legacy untrusted unstructured data storage system(s) 5223, analyzing component 542 can attempt to determine ordering information from legacy data, e.g., via data from legacy system(s) 522, that can be then employed by serializing component 544 to facilitate ordering of events comprised in events to VOES 530. Where an indication of ordering cannot be determined based on the legacy data, a default ordering can be employed, a user intervention can be requested, a warning can be set, etc. As an example, where an order cannot be determined by analyzing component 542 for legacy data from legacy untrusted unstructured data storage system(s) 5223, serializing component 544 can trigger an administrator to provide an indication of the event order to be used.

In an embodiment, LDMC 520 can comprise migrator component 540 that can facilitate migrating data from a legacy data storage system to an OES system, e.g., via a VOES, etc. Migrator component 540 can comprise analyzing component 542 and serializing component 544. Analyzing component 542 can perform analysis of data from a legacy system to facilitate generating events comprised in events to VOES 530. In this regard, analyzing component can determine reformatting of legacy data from a legacy format into an event format corresponding to a VOES.

Moreover, an analysis of legacy data can enable determining an indicator of event order, e.g., what order events derived from legacy data should be placed in, which can be particularly useful for legacy untrusted unstructured data storage system(s) 5223 that can provide either no indicator or an untrusted order indicator. Serializing component 544 can enable ordering of events that can be communicated as events to VOES 530. In an embodiment, serializing component 544 can rely on a trusted event order indicator provided via legacy trusted unstructured data storage system(s) 5222. In a further embodiment, serializing component 544 can rely on an event order indicator provided by analyzing component 542 determined from analysis of legacy untrusted unstructured data storage system(s) 5223. In another embodiment, serializing component 544 can rely on an event order employed by another stream storage system, e.g., an order of events from legacy streamed data storage systems(s) 5221.

Figure 6:
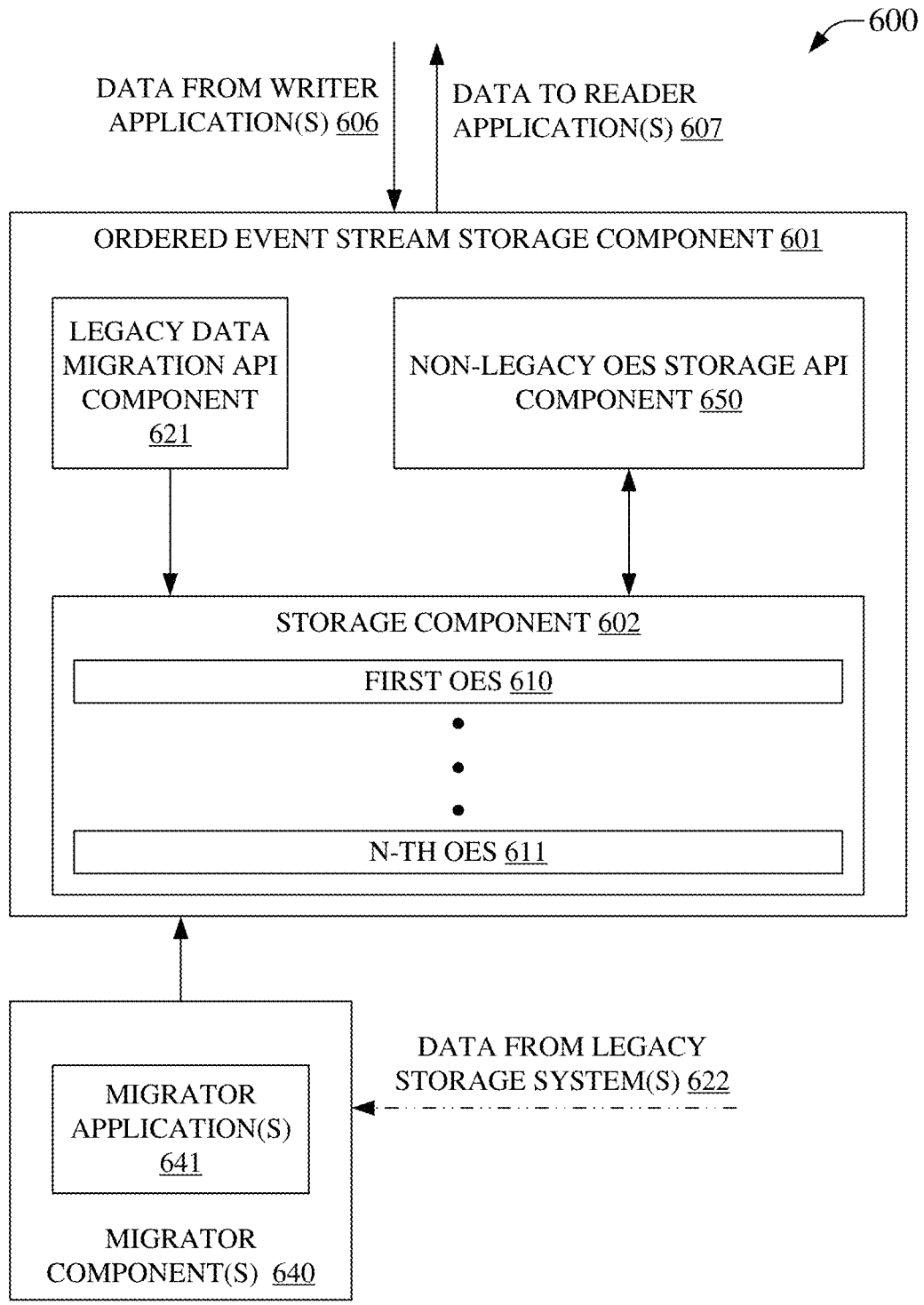
FIG. 6 is an illustration of one example embodiment enabling support of a VOES via an OES data storage system.

FIG. 6 is an illustration of a system 600, which can facilitate support of a vintage ordered event stream (VOES), an ordered event stream (OES), or a combination thereof, via an OES storage system, in accordance with embodiments of the subject disclosure. System 600 can comprise OES storage component 601 that can be the same as, or similar to system 100, etc., and can comprise legacy data migration API component 621. Legacy data migration API component 621 can support use of legacy data migration function calls, according to a corresponding API, that can facilitate migrating legacy data into stream data, e.g., migrating data from legacy storage system(s) 622 to a VOES, e.g., writing to a VOES, e.g., one or more of first OES 610 to N-th OES 611, etc. Embodiments of OES storage component 601 can receive data from writer application(s) 606 that can be stored via one or more of one or more of first OES 610 to N-th OES 611, etc. Further, embodiments of OES storage component 601 can communicate data to reader application(s) 607 from one or more of one or more of first OES 610 to N-th OES 611, etc. Reading and writing to/from an OES stored via storage component 602 can be facilitated by non-legacy OES storage API component 650. Moreover, where legacy data is stored in a VOES via storage component 602, migrating can be facilitated by legacy data migration API component 621 and reading/writing via non-legacy OES storage API component 650. In this regard, once legacy data is migrated to a VOES, then the use of non-legacy API function calls can be employed because the legacy data can be considered as having been migrated to a non-legacy event format.

System 600 can comprise one or more migrator component(s) 640 that can be the same as, or similar to, migrator component 540. Migrator component(s) 640 can receive data from legacy storage system(s) 622 can generate events to VOES, e.g., events to VOES 530, etc. In embodiments, generating events to VOES can be performed by migrator application(s) 641 of migrator component(s) 640, and can interact with OES storage component 601 via legacy data migration API component 621, etc. In some embodiments, migrator component(s) 640 can execute local to OES stream storage component 601. In other embodiments, migrator component(s) 640 can be located remotely from OES stream storage component 601. In further embodiments, some instances of migrator component(s) 640 can be local to OES stream storage component 601 and other instances can be located remotely from OES stream storage component 601. As an example, OES data storage system 600 can comprise OES storage component 601 that can comprise a first instance of migrator component(s) 640 that can perform one or more instances of migrator application(s) 641 that can enable migrating legacy data from various clients. Expanding on this example, OES data storage system 600 can communicate with a second instance of migrator component(s) 640 that can be performed by a large customer's computing systems located remotely from OES stream storage component 601. This example remotely located migrator component(s) 640 instance can execute an instance of migrator application(s) 641 that can enable generating events to VOES at the large customer, for example, where the events can be more compact than the legacy data to reduce bandwidth, etc. This remotely located mitigator application(s) 641 can then communicate to a VOES of storage component 602 via a network as supported by legacy data migration API component 621.

In an embodiment, a migration API can comprise function calls that can facilitate migration of data from a legacy storage system to a VOES. As an example, migration API function calls can comprise a call to create a vintage stream, e.g., a call can cause a VOES to be created, for example, in storage component 602, etc. Another example mitigation API function call can comprise getting a VOES state, e.g., is a migration in progress, completed, stalled, etc. A further example mitigation API function call can cause migration to end, e.g., this example call can finish migration operation(s), e.g., sealing legacy segments, placing links between legacy segments and new segments, updating an epoch state, etc. Yet another example mitigation API function call can write a legacy event, e.g., appending an event to a first part of a VOES, such as at 332, etc. other example mitigation API calls can return a location of an epoch head, epoch tail, locations of legacy events, new events prior to completion of a migration, link values to enable joining an end of a legacy events portion with a start of a new events portion, scaling of segments during migration operation(s), etc.

System 600 can illustrate migration of legacy data into an OES system, e.g., via a VOES. This migration can result in reducing disruption to data access events in comparison to conventional migration techniques. As an example, migrating legacy data to a VOES and writing new legacy data to a portion of the VOES can reduce an amount of time to migrate the legacy data in comparison to writing the new legacy data to the legacy system and then migrating it after the preexisting legacy data has been migrated. This can accelerate a return to accessing data that can be an improvement over existing technology. Moreover, a VOES can support both legacy data migration and new legacy data while maintaining event ordering can be provided.

Figure 7:
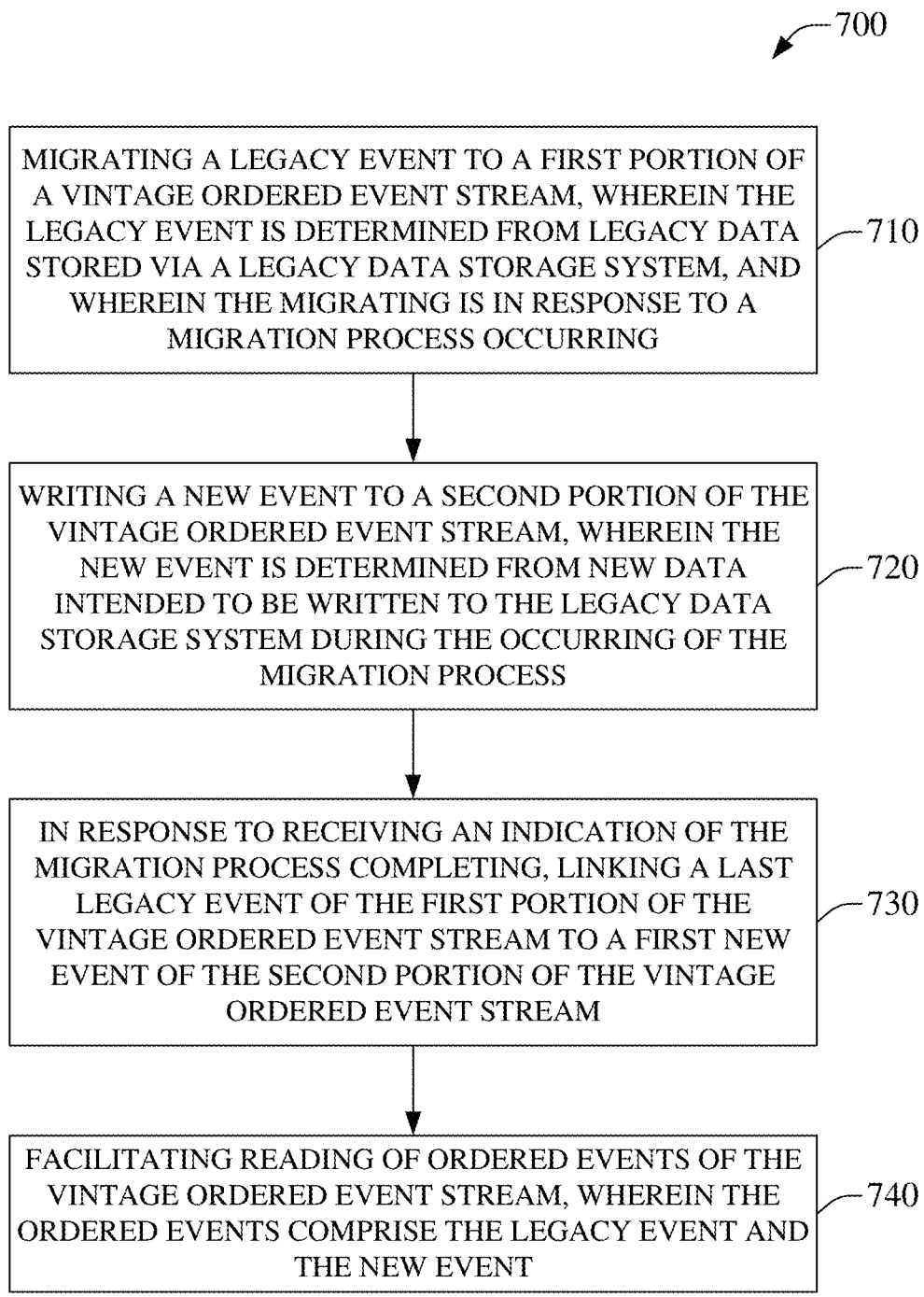
FIG. 7 is an illustration of an example embodiment facilitating migrating legacy data into an OES.
Figure 8:
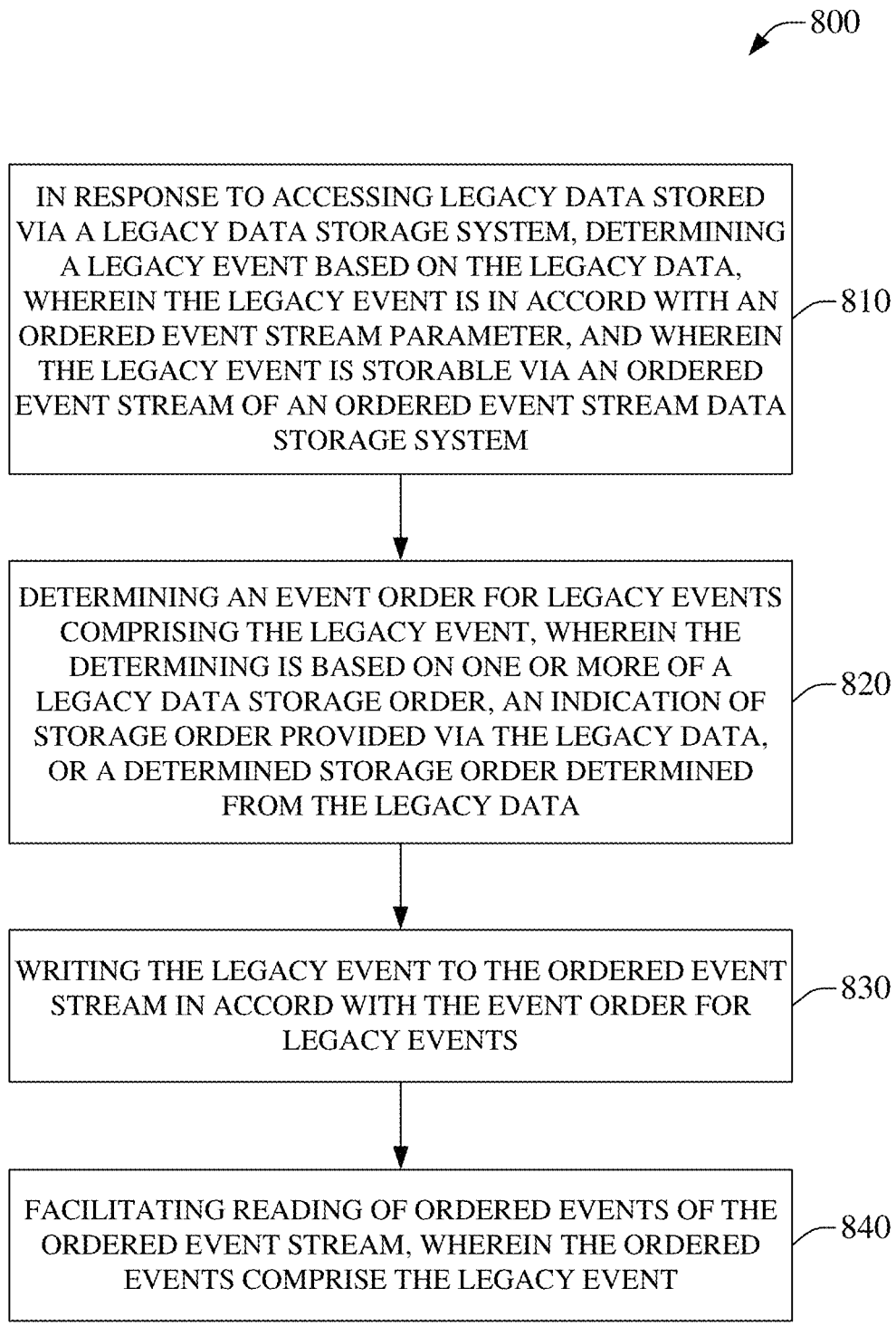
FIG. 8 is an illustration of one example embodiment facilitating determining legacy event order for migrating legacy data into an OES.

In view of the example system(s) described above, example method(s) that can be implemented in accordance with the disclosed subject matter can be better appreciated with reference to flowcharts in FIG. 7-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternately be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more embodiments herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 7 is an illustration of an example method 700, which can facilitate migrating legacy data into an ordered event stream, in accordance with embodiments of the subject disclosure. At 710, method 700 can comprise migrating a legacy event to a first portion of a vintage ordered event stream. The legacy event can be determined from legacy data stored via a legacy data storage system. In an example embodiment, in response to a migration process occurring, a component, e.g., a LDMC 120, 320, 420, etc., can determine an event that can be communicated to VOES 330, 430, 530, etc., based on data from legacy system(s) 322, 422, 522, 622, etc. The legacy event can be written to a first part of a VOES, e.g., as legacy event(s) 334 of VOES 331, for example. As such, the legacy data can be migrated as a legacy event from a legacy data storage system to a VOES.

At 720, method 700 can comprise writing a new event to a second portion of the vintage ordered event stream. The new event can be determined from new data intended to be written to the legacy data storage system during the occurring of the migration process. As has been discussed, a migration process for migrating legacy data from a legacy data storage system can occur even while new data for the legacy data storage system is being received. In this circumstance, the new data can be written as a new event in a second portion of the VOES, for example, as new event(s) 335 of VOES 331, for example. This can avoid first writing the new even to the legacy system, which can extend the migration time, due to now needing to migrate additional legacy data to the VOES. Rather, by writing the new event to a second portion of the VOES, the migration of legacy data can be completed in comparatively less time than conventional methods and can result in less disruption to data access.

Method 700, at 730, can comprise, linking a last legacy event of the first portion of the vintage ordered event stream to a first new event of the second portion of the vintage ordered event stream. The linking of the first portion of the VOES to the second portion of the VOES can be in response to receiving an indication of the migration process completing. As illustrated, for example in VOES 431, legacy event(s) 434 can be linked to new event(s) 435 upon VOES migration status 426, for example, indicating that the migration process is complete. This can result in VOES 431 being a continuous and properly ordered sequence of migrated legacy events and new events previously directed to the legacy data storage system. At this point, additional new events can be written to a VOES, e.g., as additional new event(s) 435, as new event(s) after OES scaling 437, etc.

At 740, method 700 can comprise facilitating reading of ordered events of the vintage ordered event stream. At this point method 700 can end. The ordered events of the VOES can comprise the legacy event and the new event. Referring again to VOES 431, each legacy event(s) 434 segment can link to a corresponding new event(s) 435 segment and can facilitate reading of ordered events of VOES 431 in the indicated order.

FIG. 8 is an illustration of an example method 800, which can enable migrating legacy data into an ordered event stream (OES) based on a determined sequence order, in accordance with embodiments of the subject disclosure. At 810, method 800 can comprise determining a legacy event based on the legacy data, which can be in response to accessing legacy data stored via a legacy data storage system. The legacy event can be in an accord with an ordered event stream parameter, e.g., a VOES parameter can affect migrating legacy data into the corresponding VOES, for example, events to VOES 430 can be based in part on VOES parameter(s) 424 to facilitate migration of data from legacy system(s) 422, in system 400. As such, the legacy event can be storable via a VOES, which can be an ordered event stream of an ordered event stream data storage system, for example, one of first OES 610 to N-th OES 611 as illustrated in system 600.

Method 800, at 820, can comprise determining an event order for legacy events comprising the legacy event. The determining can be based on one or more of a legacy data storage order, an indication of storage order provided via the legacy data, or a determined storage order determined from the legacy data. As an example, in system 500, data from legacy system(s) 522 can comprise data from one or more of legacy streamed data store system(s) 5221, legacy trusted unstructured data storage system(s) 5222, or legacy untrusted unstructured data storage system(s) 5223. Accordingly, at 820, the event order can be based on event stream order, on an order indicated by a trusted legacy system that does not employ event streams, or by analysis of legacy data from an untrusted legacy system that does not employ streams.

At 830, method 800 can comprise writing the legacy event to the ordered event stream in accord with the event order for legacy events. Writing he legacy events in to a VOES in a prescribed order can enable reading the events from the VOES in the same order. As such, at 840, method 800 can comprise facilitating reading of ordered events of the ordered event stream in the above noted order in which they were written into the VOES. As such, the ordered events will comprise the legacy event. At this point method 800 can end.

Figure 9:
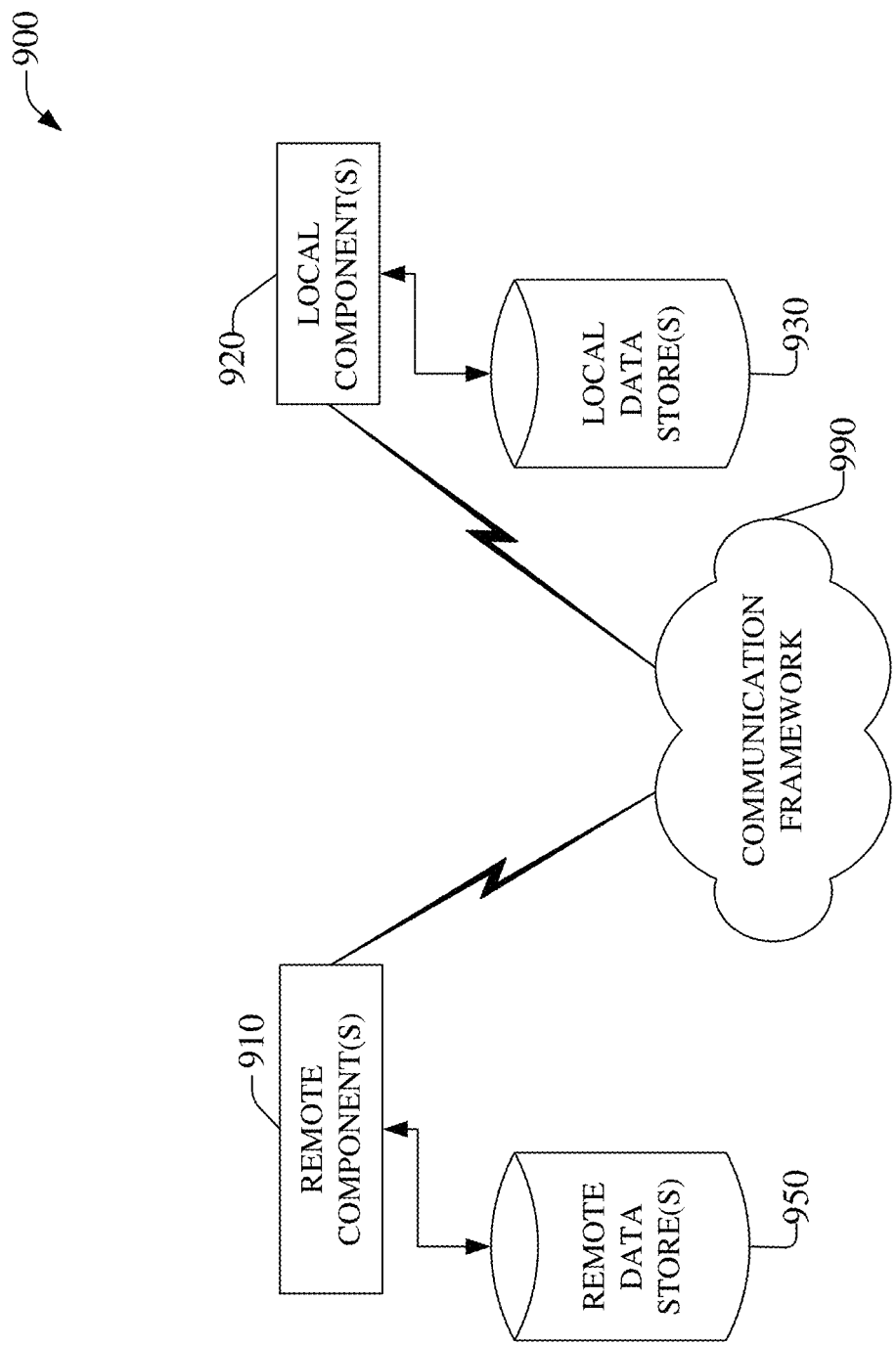
FIG. 9 depicts an example schematic block diagram of a computing environment with which an embodiment of the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a remotely located device comprised in storage component 102, 602, etc., a remotely located processor device comprised in processor component 104, a remotely located device comprised in legacy data migration component 120, 320, 420, 520, etc., migrator component(s) 540, 640, etc., or other remotely located components connected to a local component via communication framework 990. Communication framework 990 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise a local device comprised in storage component 102, a processor device comprised in processor component 104, a device comprised in legacy data migration component 120, 320, 420, 520, etc., migrator component(s) 540, 640, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 990 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 990. Similarly, local component(s) 920 can be operably connected to one or more local data store(s) 930, that can be employed to store information on the local component(s) 920 side of communication framework 990. As examples, data from legacy system(s) 322, 422, 522, 622, etc., can be communicated form a remotely located legacy system device, via communication framework 990, to local component LDMC 120, 320, 420, 520, etc., to facilitate migrating data from a legacy system to an OES system, as disclosed herein.

Figure 10:
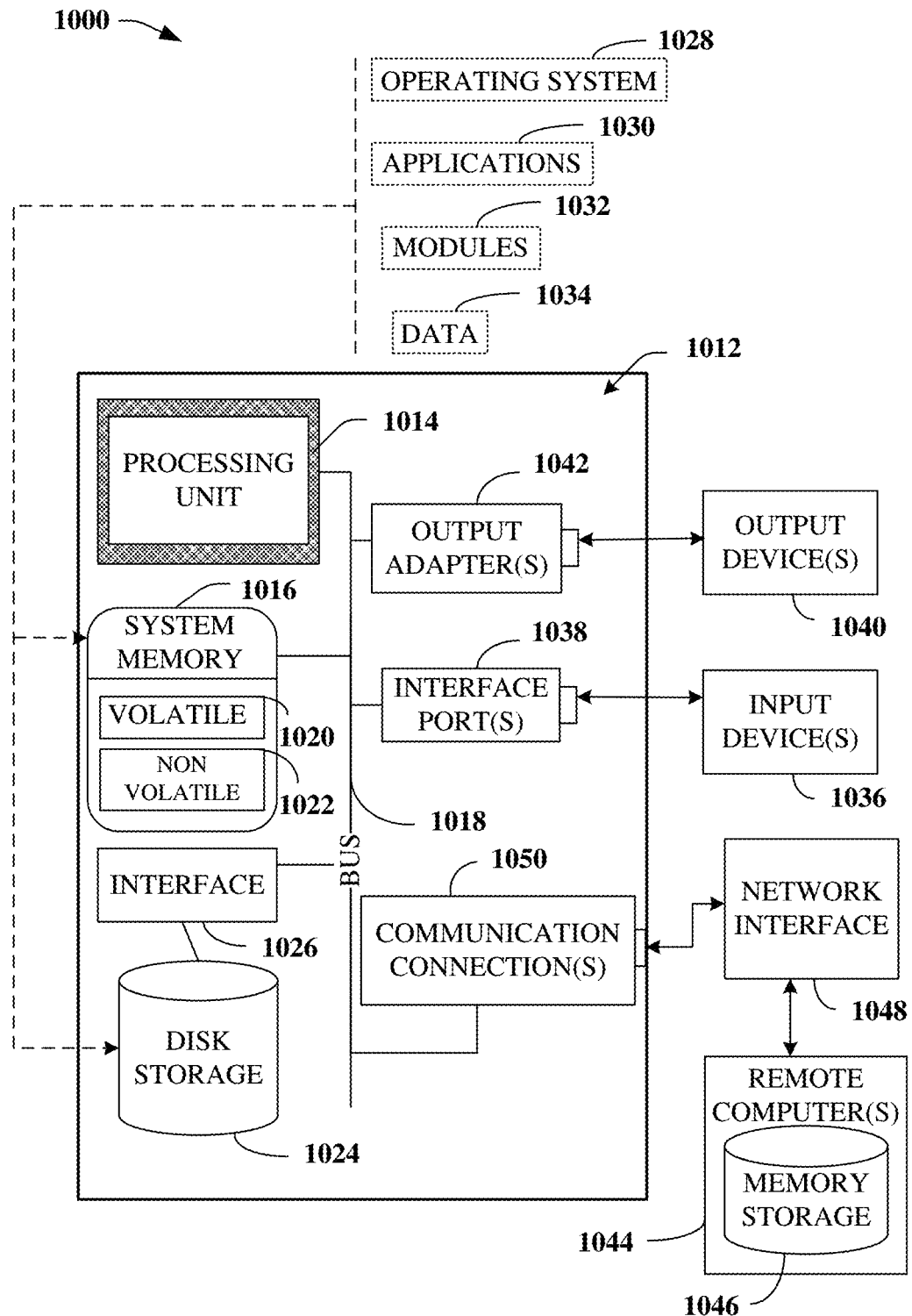
FIG. 10 illustrates an example block diagram of a computing system operable to execute the disclosed systems and methods in accordance with an embodiment.

In order to provide a context for the various embodiments of the disclosed subject matter, FIG. 10, and the following discussion, are intended to provide a brief, general description of a suitable environment in which the various embodiments of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in any of storage component 102, 602, etc., processor component 104, etc., LDMC 120, 320, 420, 520, etc., mitigator component 540, 640, etc., or other components disclosed herein, can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations comprising generating a legacy event in a first portion of an ordered event stream during a legacy data migration. Generating the legacy event can be based on legacy data stored via a legacy data storage system. The operations can further comprise generating a new event in a second portion of the ordered event stream during the legacy data migration. Generating the new event can be based on new data, and the generating the new event can be performed instead of writing the new data to the legacy data storage system. Further operations can comprise connecting a last event of the first portion of the ordered event stream to a first event of the second portion of the ordered event stream in response to determining an end to the legacy data migration, which can result in a contiguous ordered event stream comprising the legacy event and the new event in accord with a determined event sequence.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial bus port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength (λ) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
   migrating legacy data, as a legacy event, to a first portion of an ordered event stream during a legacy data migration, wherein the legacy data is stored via a legacy data storage system, wherein migrating the legacy data comprises determining an event order corresponding to writing the legacy event to the first portion of the ordered event stream in accord with a determined event sequence, wherein the event order is determined based on analysis of the legacy data due to a lack of data ordering information being provided by the legacy data storage system, and wherein the legacy data storage system is an unstructured data storage system;
   writing a new event to a second portion of the ordered event stream, wherein the new event is based on new data received during the legacy data migration and wherein the new event is not yet stored via the legacy data storage system; and
   in response to the legacy data migration being determined to have concluded, linking between a last event of the first portion of the ordered event stream and a first event of the second portion of the ordered event stream, resulting in the ordered event stream comprising both the legacy event and the new event, each in accord with the determined event sequence.

2. The system of claim 1, wherein writing the new event to the second portion of the ordered event stream is in lieu of writing the new data to the legacy data storage system.

3. The system of claim 1, wherein the ordered event stream is generated faster than another ordered event stream, wherein the other ordered event stream is generated by migrating the legacy data to the other ordered event stream, writing the new data to the legacy data storage system, and further migrating the new data from the legacy data storage system to the other ordered event stream.

4. The system of claim 1, wherein the event order is determined based on a legacy data order corresponding to storing the legacy data via the legacy data storage system.

5. The system of claim 1, wherein the event order is determined based on data ordering information comprised in the legacy data.

6. The system of claim 1, wherein the event order is determined based on data ordering information determined from an analysis of the legacy data rather than on the data ordering information comprised in the legacy data.

7. The system of claim 1, wherein events comprising the legacy event and the new event are readable from the ordered event stream in a sequence that accords with the determined event sequence.

8. The system of claim 1, wherein the ordered event stream supports scaling operations subsequent to the legacy data migration being determined to have concluded.

9. The system of claim 1, wherein the ordered event stream enables function calls to a single namespace in relation to both the legacy event and the new event.

10. A method, comprising:
in response to beginning a migration of legacy data from a legacy data storage system to an ordered event stream data storage system, migrating, by a system comprising a processor, legacy data as a legacy event to a first portion of an ordered event stream of the ordered event stream data storage system, wherein the migrating comprises determining an event order corresponding to writing the legacy event to the first portion of the ordered event stream in accord with a determined event sequence, and wherein based on data ordering information corresponding to the legacy event is not received from the legacy data storage system, the event order is determined based on an analysis of the legacy data;
writing, by the system, a new event to a second portion of the ordered event stream, wherein the new event corresponds to new data targeted for storage via the legacy data storage system, and wherein writing the new event to the second portion of the ordered event stream supersedes writing the new data to the legacy data storage system; and
generating, by the system, a logical connection from a last event of the first portion of the ordered event stream to a first event of the second portion of the ordered event stream in response to determining completion of the migration, wherein the logical connected enables sequential reading of events from the first portion of the ordered event stream to the second portion of the ordered event stream.

11. The method of claim 10, wherein the ordered event stream data storage system is a first ordered event stream data storage system, and wherein the legacy data storage system is not an ordered event stream data storage system.

12. The method of claim 10, wherein the legacy data storage system is an unstructured data storage system that is not an ordered event stream data storage system.

13. The method of claim 10, wherein the event order is determined based on a legacy data order corresponding to storing the legacy data via the legacy data storage system.

14. The method of claim 10, wherein the event order is determined based on data ordering information determined from an analysis of the legacy data rather than on the data ordering information comprised in the legacy data.

15. The method of claim 10, wherein the event order is determined based on data ordering information comprised in the legacy data.

16. A non-transitory machine-readable medium, comprising executable instructions that, when executed by a processor, facilitate performance of operations, comprising:
generating a legacy event in a first portion of an ordered event stream during a legacy data migration, wherein generating the legacy event is based on legacy data stored via a legacy data storage system, wherein the legacy data migration comprises determining an event order corresponding to the generating the legacy event in the first portion of the ordered event stream in accord with a determined event sequence, and wherein, based on data ordering information corresponding to the legacy event not being received from the legacy data storage system, the event order is determined based on an analysis of the legacy data;
generating a new event in a second portion of the ordered event stream during the legacy data migration, wherein generating the new event is based on new data, and wherein generating the new event is performed in lieu of writing the new data to the legacy data storage system; and
in response to determining the legacy data migration has ended, connecting a last event of the first portion of the ordered event stream to a first event of the second portion of the ordered event stream, resulting in a contiguous ordered event stream comprising the legacy event, in accord with the determined event sequence, and the new event, also in accord with the determined event sequence.

17. The non-transitory machine-readable medium of claim 16, wherein the determined event sequence is determined from an analysis of the legacy data.

18. The non-transitory machine-readable medium of claim 16, wherein the determined event sequence is determined from sequence information comprised in the legacy data.

19. The non-transitory machine-readable medium of claim 16, wherein the legacy data storage system is an unstructured data storage system that is not an ordered event stream data storage system.

20. The non-transitory machine-readable medium of claim 16, wherein the event order is determined based on data ordering information determined from an analysis of the legacy data rather than on the data ordering information comprised in the legacy data.

* * * * *